US010551871B2

(12) United States Patent
Cheng et al.

(10) Patent No.: US 10,551,871 B2
(45) Date of Patent: Feb. 4, 2020

(54) INTERACTIVE MULTIMEDIA ASSISTANT DEVICE WITH A SWAPPABLE PERSONALITY CUSTOMIZABLE SKIN

(71) Applicant: The Chamberlain Group, Inc., Oak Brook, IL (US)

(72) Inventors: Fred Cheng, Los Altos Hills, CA (US); Herman Yau, Sunnyvale, CA (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 16/381,469

(22) Filed: Apr. 11, 2019

(65) Prior Publication Data

US 2019/0265753 A1    Aug. 29, 2019

Related U.S. Application Data

(63) Continuation of application No. 15/903,508, filed on Feb. 23, 2018, now Pat. No. 10,289,152.

(51) Int. Cl.
| | |
|---|---|
| *H05K 5/00* | (2006.01) |
| *H05K 7/00* | (2006.01) |
| *G06F 1/16* | (2006.01) |
| *G10L 15/26* | (2006.01) |
| *G06F 9/451* | (2018.01) |

(52) U.S. Cl.
CPC ............ *G06F 1/1613* (2013.01); *G06F 9/453* (2018.02); *G10L 15/265* (2013.01); *G06F 2200/1633* (2013.01)

(58) Field of Classification Search
CPC ........................................................ H05K 5/00
See application file for complete search history.

(56) References Cited

U.S. PATENT DOCUMENTS

| | | | |
|---|---|---|---|
| 10,289,152 B1 | 5/2019 | Cheng | |
| 2003/0142070 A1 | 7/2003 | Gartrell | |
| 2010/0235726 A1* | 9/2010 | Ording | G06F 1/1626 715/234 |
| 2014/0364212 A1* | 12/2014 | Osman | A63F 13/213 463/31 |

* cited by examiner

*Primary Examiner* — Jerry Wu
(74) *Attorney, Agent, or Firm* — Fitch Even Tabin & Flannery LLP

(57) ABSTRACT

An interactive multimedia assistant device (IMAD) includes an interactive core component (ICC) and a swappable personality customizable skin (SPCS) for performing interactive communication and control actions based on multimedia inputs. The ICC includes multimedia sensors for recognizing multimedia inputs; a storage medium for storing the multimedia inputs and media content; a controller for processing the multimedia inputs, modulating an audio output, and performing control actions based on the multimedia inputs; output devices for rendering outputs of the controller, and one or more communication interfaces for communicating with the SPCS. The SPCS is operably coupled on and activated by the ICC. The SPCS is programmed with a unique identifier that identifies a personality of the SPCS. The SPCS directs and programs behavior of the ICC based on the unique identifier, thereby allowing the ICC to assume the personality for performing interactive communication and control actions based on the multimedia inputs.

17 Claims, 14 Drawing Sheets

INTERACTIVE MULTIMEDIA ASSISTANT DEVICE WITH A SWAPPABLE PERSONALITY CUSTOMIZABLE SKIN

RELATED APPLICATION

This is a continuation of U.S. patent application Ser. No. 15/903,508, filed Feb. 23, 2018, entitled INTERACTIVE MULTIMEDIA ASSISTANT DEVICE WITH A SWAPPABLE PERSONALITY CUSTOMIZABLE SKIN which is incorporated by reference in its entirety herein.

BACKGROUND

With the increasing popularity of portable electronics, electronic devices are required to handle more functions and become more interactive. When a user inputs a request to an electronic device, for example, by providing a voice command or by gesturing instead of touching or typing on a graphical user interface of the electronic device, the user's interaction with the electronic device is similar to a human-to-human interaction, and therefore becomes more natural and intuitive. While some electronic devices recognize gestures and perform control actions based on the recognized gestures, these electronic devices may not be able to recognize a combination of different multimedia inputs that may be geolocation sensitive and perform control actions based on the combination of different multimedia inputs.

Conventional human-to-machine interaction systems exhibit a singularly defined behavior. Albeit modifiable by software or firmware updates, these human-to-machine interaction systems are not readily customizable by a user in terms of adding unique appearances and behavior of a preferred personality or a preferred character to the human-to-machine interaction systems. Moreover, these human-to-machine interaction systems cannot assume a swappable personality defined by the user and/or the machine, interactively communicate with the user through the swappable personality, and perform multiple control actions based on multiple different multimedia inputs provided by the user. Furthermore, these human-to-machine interaction systems do not dynamically adapt to the user's location and dynamically update their functions to receive and play location-based data and media content through the swappable personality defined by the user and/or the machine.

Hence, there is a long felt but unresolved need for an interactive multimedia assistant device comprising an interactive core component with a swappable personality customizable skin that assumes a distinct personality for performing interactive communication and control actions based on one or a combination of multiple multimedia inputs, for example, gestures, an image input, an audio input, etc. Furthermore, there is a need for an interactive multimedia assistant device that dynamically adapts to a user's location and dynamically updates its functions to receive and play location-based data and media content through a personality defined by a swappable personality customizable skin.

SUMMARY OF THE INVENTION

This summary is provided to introduce a selection of concepts in a simplified form that are further disclosed in the detailed description of the invention. This summary is not intended to determine the scope of the claimed subject matter.

The interactive multimedia assistant device (IMAD) disclosed herein addresses the above recited needs for performing interactive communication and control actions based on multiple multimedia inputs comprising, for example, gestures, an image input, an audio input, etc., and any combination thereof. Furthermore, the IMAD disclosed herein dynamically adapts to a user's location and dynamically updates its functions to receive and play location-based data and media content through a personality defined by a swappable personality customizable skin. The IMAD disclosed herein comprises an interactive core component, hereinafter referred as an "interactive core", and a swappable personality customizable skin. The interactive core of the IMAD comprises one or more of multiple multimedia sensors, a non-transitory computer readable storage medium, a controller, one or more output devices, and one or more communication interfaces. The multimedia sensors are positioned within the interactive core for detecting, recognizing, capturing, and tracking one or more of the multimedia inputs. The non-transitory computer readable storage medium stores the multimedia inputs and media content. The controller executes computer program instructions for processing the multimedia inputs received from the multimedia sensors, modulating an audio output, and performing one or more of the control actions based on the processed multimedia inputs. The output devices are operably connected to the controller for rendering outputs of the controller. The communication interfaces communicate with the swappable personality customizable skin positioned on the interactive core.

The swappable personality customizable skin of the interactive multimedia assistant device (IMAD) is operably coupled on one or more configurable locations of the interactive core, and in an embodiment, is activated by the interactive core. The swappable personality customizable skin is programmed with a unique identifier that identifies a personality of the swappable personality customizable skin. The swappable personality customizable skin directs and programs behavior of the interactive core based on the unique identifier communicated to the interactive core via one of the communication interfaces, thereby allowing the interactive core to assume the personality of the swappable personality customizable skin for performing interactive communication and control actions based on the multimedia inputs. In an embodiment, the interactive core directs and programs behavior of the swappable personality customizable skin based on the unique identifier communicated to the interactive core by the swappable personality customizable skin via one of the communication interfaces.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
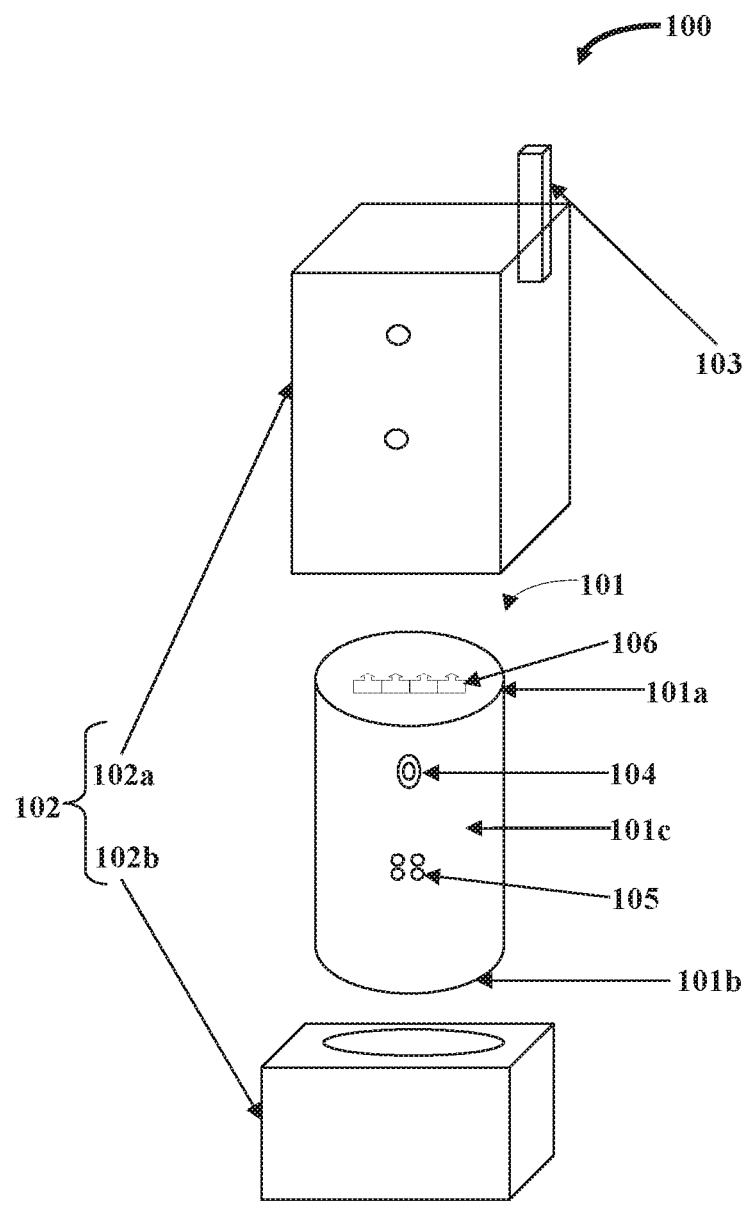
FIG. 1 exemplarily illustrates a disassembled front perspective view of an interactive multimedia assistant device for performing interactive communication and control actions based on multiple multimedia inputs.

FIG. 1 exemplarily illustrates a disassembled front perspective view of an interactive multimedia assistant device (IMAD) 100 for performing interactive communication and control actions based on multiple multimedia inputs. As used herein, "interactive communication" refers to a dynamic interpersonal exchange of thoughts, ideas, opinions, or information between entities, for example, users and devices through interactions. Also, as used herein, "multimedia inputs" refer to inputs provided in different combined and individual formats, for example, images, gestures, motions, geolocation, audio such as voice, sound, etc. The IMAD 100 disclosed herein comprises an interactive core component 101, hereinafter referred as an "interactive core", and a swappable personality customizable skin 102. The IMAD 100 disclosed herein is a sound, image, and gesture-capable intelligent, interactive assistant device coupled with the swappable personality customizable skin 102. The interactive core 101 of the IMAD 100 disclosed herein is a multimedia based interactive device capable of capturing and recognizing multimedia inputs comprising, for example, gestures, an image input, an audio input such as sound, etc., and any combination thereof, and performing interactive communication with a user, and control actions based on the multimedia inputs. The interactive core 101 performs electronic and control functions of the IMAD 100.

As used herein, "personality" refers to an aggregate of features, traits, style, appearance, and behavioral characteristics that form a distinct nature. Also, as used herein, "personality customizable skin" refers to a structural element comprising one or more skin pieces that graphically, in three dimensions, define a personality or a character with a unique appearance, behavior, and functionality, and that can be operably coupled to the interactive core 101 to customize the interactive core 101 and allow the interactive core 101 to assume the personality of the personality customizable skin 102. The personality customizable skin 102 is configured to appear, for example, as a person, a fictional movie character, a cartoon character, a game character, an animal, a model of a car, a model of an airplane, etc. Coupling the personality customizable skin 102 to the interactive core 101 adds a personality to the interactive core 101. The personality customizable skin 102 can be decoupled and swapped at will to allow the interactive core 101 to assume a different personality with a different appearance, behavior, and functionality.

The interactive core 101 is configured, for example, as a cylinder of a configurable size comprising a top end 101a and a bottom end 101b as exemplarily illustrated in FIG. 1. The interactive core 101 is configured to allow effort free fitting and coupling of the swappable personality customizable skin 102 thereon. The interactive core 101 allows a geometrical coupling, a mechanical coupling, and an electrical coupling of the swappable personality customizable skin 102 thereon to project an outward appearance of the personality defined by the swappable personality customizable skin 102. In an embodiment, the interactive core 101 is of a contact type that allows wired communication between the interactive core 101 and the swappable personality customizable skin 102 using, for example, matching footprint pluggable and unpluggable pin contacts 106 and/or one or more wired interfaces. Pin contacts 106 are positioned, for example, on the top end 101a of the interactive core 101 as exemplarily illustrated in FIG. 1. The pin contacts 106 on the top end 101a of the interactive core 101 engage with contacts (not shown) positioned in the swappable personality customizable skin 102 to allow a wired communication between the interactive core 101 and the swappable personality customizable skin 102. The interactive core 101 comprises one or more of multiple multimedia sensors 116 exemplarily illustrated in FIG. 7, positioned therewithin for detecting, recognizing, capturing, and tracking one or more multimedia inputs, for example, gestures, an image input, an audio input, etc., as disclosed in the detailed description of FIG. 7. For example, an image and/or gesture sensor 104 and a microphone 105 are positioned on a front section 101c of the interactive core 101 as exemplarily illustrated in FIG. 1.

The swappable personality customizable skin 102 of the interactive multimedia assistant device (IMAD) 100 disclosed herein is operably coupled on one or more configurable locations of the interactive core 101. The swappable personality customizable skin 102 comprises a single skin piece or multiple skin pieces. In an embodiment as exemplarily illustrated in FIG. 1, the swappable personality customizable skin 102 is a two-piece combination of a top skin piece 102a and a bottom skin piece 102b that can be operably coupled to the top end 101a and the bottom end 101b of the interactive core 101 respectively. Although the detailed description refers to the swappable personality customizable skin 102 comprising the top skin piece 102a and the bottom skin piece 102b that can be operably coupled to the top end 101a and the bottom end 101b of the interactive core 101 respectively, the scope of the swappable personality customizable skin 102 in the IMAD 100 disclosed herein is not limited to the top skin piece 102a and the bottom skin piece 102b but may be extended to include a single skin piece, for example, only a top skin piece 102a, or only a bottom skin piece 102b, or one or more side skin pieces, or any combination of skin pieces that can be operably coupled to different ends, sides, and sections of the interactive core 101. The top skin piece 102a and the bottom skin piece 102b of the swappable personality customizable skin 102 are separate as exemplarily illustrated in FIG. 1, until mounted on and operably coupled to the interactive core 101 as exemplarily illustrated in FIGS. 5A-5B and FIGS. 6A-6B.

The swappable personality customizable skin 102 is assigned a unique identifier or an access token that identifies a personality, for example, a fictional movie character personality. The unique identifier is, for example, a numeric string or an alphanumeric string associated with a single specific entity, that is, the swappable personality customizable skin 102 for addressing and identifying the swappable personality customizable skin 102. The swappable personality customizable skin 102 is programmed with the assigned unique identifier during a manufacturing process of the swappable personality customizable skin 102 for identifying a type of personality, a name, an appearance, and a behavior of the swappable personality customizable skin 102. The unique identifier of the swappable personality customizable skin 102 defines and activates a niche of the swappable personality customizable skin 102 and functions and features built into the interactive core 101.

Figure 2A:
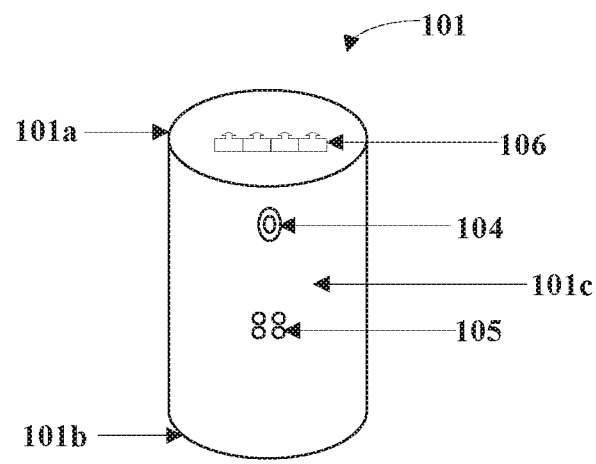
FIG. 2A exemplarily illustrates a front perspective view of an interactive core component of the interactive multimedia assistant device shown in FIG. 1.

FIG. 2A exemplarily illustrates a front perspective view of the interactive core 101 of the interactive multimedia assistant device (IMAD) 100 shown in FIG. 1. In an embodiment, the interactive core 101 is of a contact type and comprises pin contacts 106 positioned on the top end 101a of the interactive core 101 as exemplarily illustrated in FIG. 2A. The pin contacts 106 are, for example, mechanical pin contacts, patterned pin contacts, etc., and provide a communication interface for allowing communication between the interactive core 101 and the swappable personality customizable skin 102 exemplarily illustrated in FIG. 1. For example, the swappable personality customizable skin 102 transmits the unique identifier of the swappable personality customizable skin 102 to the interactive core 101 via the pin contacts 106 to allow the interactive core 101 to assume the personality of the swappable personality customizable skin 102 for performing interactive communication with a user and control actions based on multimedia inputs. One or more multimedia sensors, for example, an image and/or gesture sensor 104 and a microphone 105 are positioned on the front section 101c of the interactive core 101 as exemplarily illustrated in FIG. 2A. The image and/or gesture sensor 104 detects, recognizes, captures, and tracks an image input and/or gestures provided by a user. The microphone 105 detects, recognizes, captures, and tracks an audio input, for example, a voice command spoken by the user.

Figure 2B:
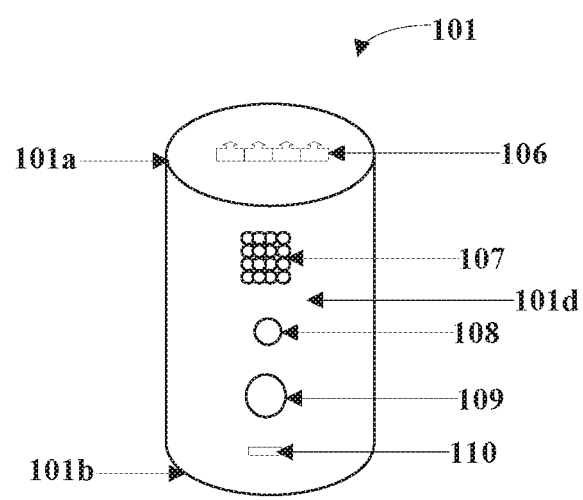
FIG. 2B exemplarily illustrates a rear perspective view of the interactive core component of the interactive multimedia assistant device shown in FIG. 1.

FIG. 2B exemplarily illustrates a rear perspective view of the interactive core 101 of the interactive multimedia assistant device (IMAD) 100 shown in FIG. 1. The interactive core 101 further comprises one or more output devices, for example, 107, 108, etc., for rendering outputs of the interactive core 101. The output devices comprise, for example, output speakers 107 for playing media content stored in the interactive core 101 and/or an audio input detected, for example, by the microphone 105 exemplarily illustrated in FIG. 2A. The output devices further comprise, for example, light sources 108 such as light emitting diodes (LEDs) for indicating one of the multimedia inputs received from the multimedia sensors 116 exemplarily illustrated in FIG. 7 and as disclosed in the detailed description of FIG. 7. The output devices, for example, an output speaker 107 and a light source 108 are positioned on a rear section 101d of the interactive core 101 as exemplarily illustrated in FIG. 2B.

In an embodiment, the interactive multimedia assistant device (IMAD) 100 further comprises one or more interface elements positioned on the interactive core 101 for receiving a manual control input to control one or more of the output devices, for example, 107, 108, etc., and/or for activating one or more supplementary components 103 positioned on the swappable personality customizable skin 102 exemplarily illustrated in FIG. 1. For example, a manual control input button 109 is positioned on the rear section 101d of the interactive core 101 as exemplarily illustrated in FIG. 2B. The manual control input button 109 allows a user to provide a manual control input to activate the interactive multimedia assistant device (IMAD) 100. In an embodiment, the manual control input button 109 allows the user to provide a manual control input to control one or more output devices, for example, 107, 108, etc., and/or activate one or more supplementary components 103 positioned on the swappable personality customizable skin 102. For example, the manual control input button 109 allows the user to provide a manual control input to move the supplementary component 103 positioned on the swappable personality customizable skin 102 exemplarily illustrated in FIG. 1. A user may press the manual control input button 109 to trigger functions and sounds of the interactive core 101. The interactive core 101 activates the interface elements, for example, the manual control input button 109, the output devices, for example, the output speakers 107, the light sources 108, etc., in accordance with the traits of the personality defined by the swappable personality customizable skin 102.

In another example, a mechanical contact port 110 is positioned on the rear section 101d of the interactive core 101 as exemplarily illustrated in FIG. 2B. In an embodiment, the mechanical contact port 110 is a charging port that allows an electrical connection of the interactive core 101 to a power source (not shown) for charging an energy storage device 112, for example, a battery of the interactive core 101 exemplarily illustrated in FIG. 2C, to provide operating power to the interactive multimedia assistant device (IMAD)

100. In another embodiment, the mechanical contact port 110 is a universal serial bus (USB) port for communicating media content between the interactive core 101 and one or more external devices, for example, user devices. In another embodiment, the mechanical contact port 110 is an input/output (I/O) port that allows input of data into the interactive core 101 and output of data from the interactive core 101. In an embodiment (not shown), the output devices, for example, 107, 108, etc., and the interface elements, for example, 109 and 110 are positioned on the front section 101c of the interactive core 101 exemplarily illustrated in FIG. 2A. In another embodiment (not shown), one or more multimedia sensors are positioned on the rear section 101d of the interactive core 101.

Figure 2C:
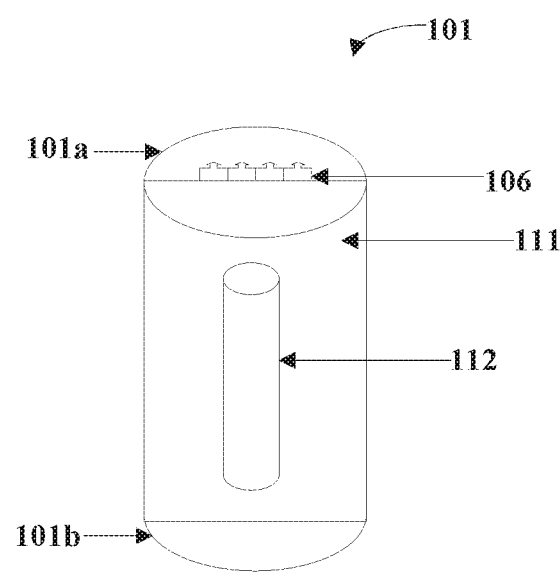
FIG. 2C exemplarily illustrates an interior view of the interactive core component of the interactive multimedia assistant device shown in FIG. 1.

FIG. 2C exemplarily illustrates an interior view of the interactive core 101 of the interactive multimedia assistant device (IMAD) 100 shown in FIG. 1. The interactive core 101 further comprises an energy storage device 112, for example, a battery such as a lithium-ion battery, a lithium polymer battery, etc., for powering the interactive core 101 to activate the IMAD 100. In an embodiment, the interactive core 101 comprises a removable energy storage device. In another embodiment, the interactive core 101 comprises a non-removable energy storage device. The energy storage device 112 receives electrical energy from a power source (not shown) and stores the received electrical energy for activating the multimedia sensors 116, a controller 121, the output devices, for example, 107 and 108, communication interfaces 123, and other components of the interactive core 101 exemplarily illustrated in FIG. 7, and for powering the swappable personality customizable skin 102 exemplarily illustrated in FIG. 1. The interior view exemplarily illustrated in FIG. 2C, shows an electronic printed circuit board (PCB) 111 that accommodates the controller 121 of the interactive core 101. The electronic PCB 111 electrically connects the controller 121 to the energy storage device 112, the multimedia sensors 116, the output devices, for example, 107 and 108, the communication interfaces 123 exemplarily illustrated in FIG. 7, and other components of the interactive core 101. The electronic PCB 111 also electrically connects the controller 121 to the swappable personality customizable skin 102 via the pin contacts 106 for performing interactive communication and control actions based on multiple multimedia inputs.

Figure 3:
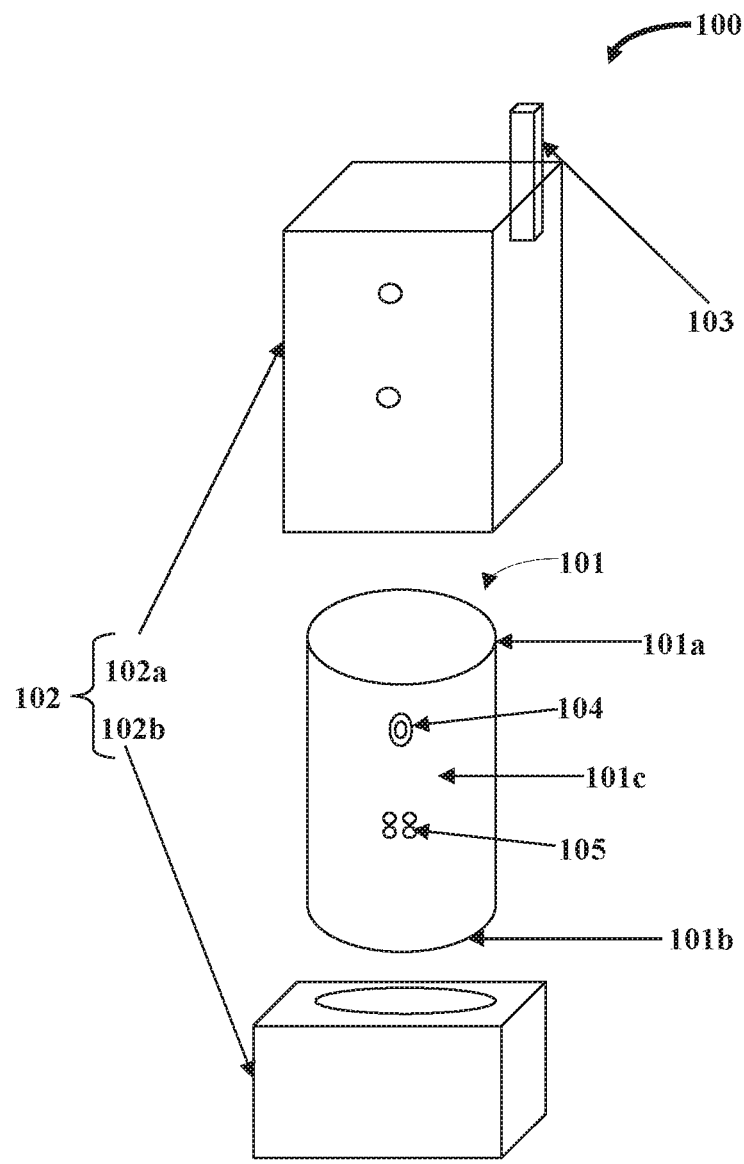
FIG. 3 exemplarily illustrates a disassembled front perspective view of an embodiment of the interactive multimedia assistant device for performing interactive communication and control actions based on multiple multimedia inputs.

FIG. 3 exemplarily illustrates a disassembled front perspective view of an embodiment of the interactive multimedia assistant device (IMAD) 100 for performing interactive communication and control actions based on multiple multimedia inputs. In this embodiment, the interactive core 101 is of a contactless type that allows wireless communication between the interactive core 101 and the swappable personality customizable skin 102 using, for example, wireless interfaces. In this embodiment, the skin pieces 102a and 102b of the swappable personality customizable skin 102 are wirelessly and passively powered, for example, by radio frequency identification (RFID) interrogating radio signals emitted by the interactive core 101 to the swappable personality customizable skin 102 in a contactless manner. In an embodiment, RFID chips are embedded in the skin pieces 102a and 102b of the swappable personality customizable skin 102. When the skin pieces 102a and 102b of the swappable personality customizable skin 102 are operably coupled to the interactive core 101, the embedded RFID chips are activated by a wireless communication interface, for example, a wireless connectivity block 1 (WCB1) 124 of the interactive core 101 exemplarily illustrated in FIG. 7.

In an embodiment, a radio frequency identification (RFID) tag is assigned to and positioned on the swappable personality customizable skin 102. The RFID tag uniquely identifies the swappable personality customizable skin 102 and allows the swappable personality customizable skin 102 to be tracked by an RFID reader 128 operably connected within the interactive core 101 as exemplarily illustrated in FIG. 7. The RFID tag contains electronically stored data relating, for example, to name, type, appearance, and behavior of the swappable personality customizable skin 102. The RFID tag uses radio waves to transfer data to the RFID reader 128. The RFID reader 128 of the interactive core 101 reads the RFID tag of the swappable personality customizable skin 102. The interactive core 101 uses electromagnetic fields to automatically identify and track the RFID tag attached to the swappable personality customizable skin 102.

Figure 4A:
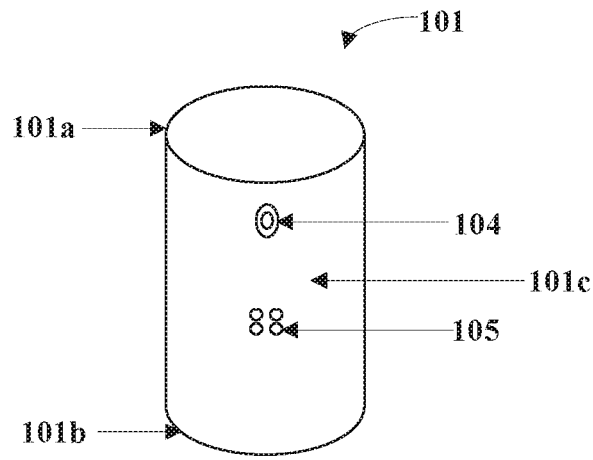
FIG. 4A exemplarily illustrates a front perspective view of an interactive core component of the embodiment of the interactive multimedia assistant device shown in FIG. 3.

FIG. 4A exemplarily illustrates a front perspective view of the interactive core 101 of the embodiment of the interactive multimedia assistant device (IMAD) 100 shown in FIG. 3. One or more multimedia sensors, for example, an image and/or gesture sensor 104 and a microphone 105 are positioned on the front section 101c of the interactive core 101 as exemplarily illustrated in FIG. 4A, and as disclosed in the detailed description of FIG. 2A.

Figure 4B:
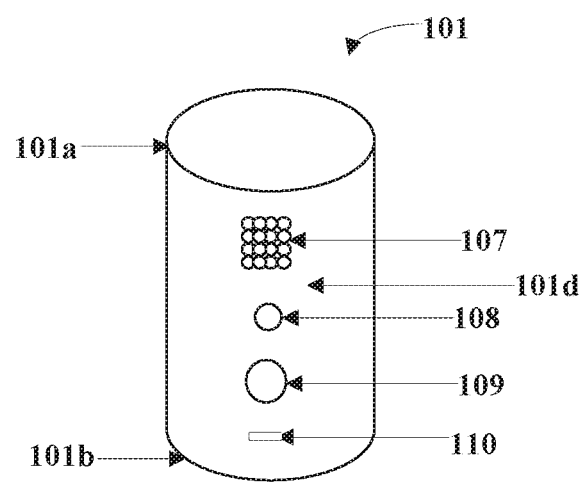
FIG. 4B exemplarily illustrates a rear perspective view of the interactive core component of the embodiment of the interactive multimedia assistant device shown in FIG. 3.

FIG. 4B exemplarily illustrates a rear perspective view of the interactive core 101 of the embodiment of the interactive multimedia assistant device (IMAD) 100 shown in FIG. 3. One or more output devices, for example, the output speakers 107 and the light sources 108, and one or more interface elements, for example, a manual control input button 109 and a mechanical contact port 110 are positioned on the rear section 101d of the interactive core 101 as exemplarily illustrated in FIG. 4B, and as disclosed in the detailed description of FIG. 2B.

Figure 4C:
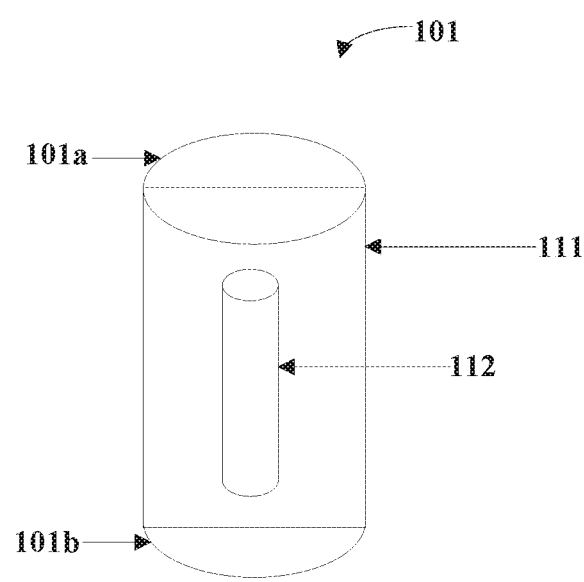
FIG. 4C exemplarily illustrates an interior view of the interactive core component of the embodiment of the interactive multimedia assistant device shown in FIG. 3.

FIG. 4C exemplarily illustrates an interior view of the interactive core 101 of the embodiment of the interactive multimedia assistant device (IMAD) 100 shown in FIG. 3. The interior view exemplarily illustrated in FIG. 4C, shows an energy storage device 112 and an electronic printed circuit board (PCB) 111 as disclosed in the detailed description of FIG. 2C.

Figure 5A:
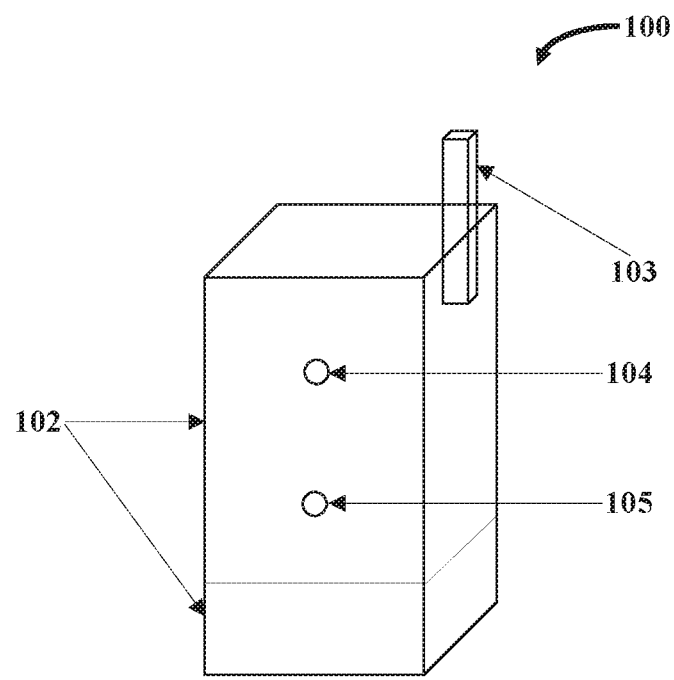
FIG. 5A exemplarily illustrates an assembled front perspective view of the interactive multimedia assistant device for performing interactive communication and control actions based on multiple multimedia inputs.
Figure 5B:
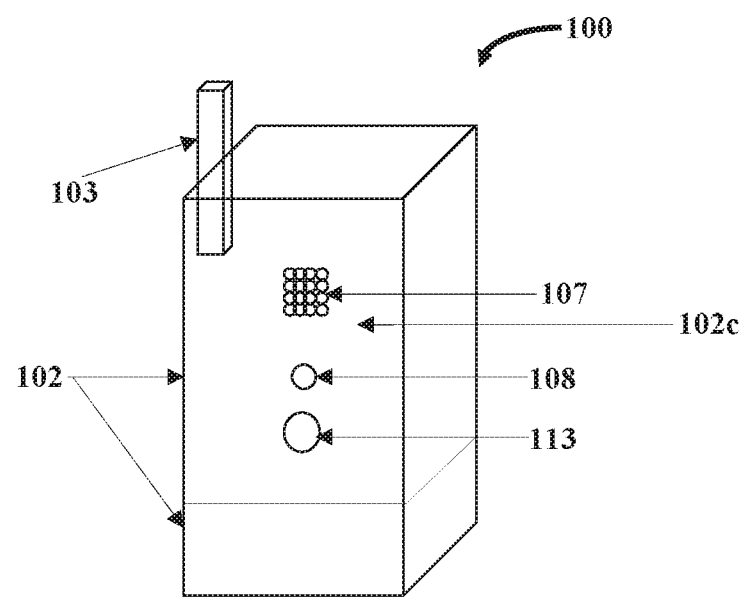
FIG. 5B exemplarily illustrates an assembled rear perspective view of the interactive multimedia assistant device for performing interactive communication and control actions based on multiple multimedia inputs.

FIGS. 5A-5B exemplarily illustrate an assembled front perspective view and an assembled rear perspective view respectively, of the interactive multimedia assistant device (IMAD) 100 for performing interactive communication and control actions based on multiple multimedia inputs. The top skin piece 102a and the bottom skin piece 102b of the swappable personality customizable skin 102 exemplarily illustrated in FIG. 1 and FIG. 3, are mounted on and operably coupled to the interactive core 101 as exemplarily illustrated in FIGS. 5A-5B. The top skin piece 102a and the bottom skin piece 102b of the swappable personality customizable skin 102 can be easily and conveniently slipped onto the top end 101a and the bottom end 101b of the interactive core 101 respectively, firmly coupled, and securely locked to the top end 101a and the bottom end 101b of the interactive core 101 respectively. The swappable personality customizable skin 102 has a distinct personality including a unique name, a type, an appearance, and behavior. The swappable personality customizable skin 102 can be swapped in and out of coupling with the top end 101a and the bottom end 101b of the interactive core 101 based on a user's preference.

When the skin pieces 102a and 102b of the swappable personality customizable skin 102 are mounted onto the interactive core 101, the interactive core 101 assumes the complete appearance of the swappable personality customizable skin 102 as the top end 101a and the bottom end 101b of the interactive core 101 are obscured by the top skin piece 102a and the bottom skin piece 102b of the swappable personality customizable skin 102 respectively, as exemplarily illustrated in FIGS. 5A-5B. The bottom skin piece 102b of the swappable personality customizable skin 102 locks onto the bottom end 101b of the interactive core 101, thereby allowing one or more components of the interactive core 101 to function efficiently. The interactive core 101 activates the swappable personality customizable skin 102. In an embodiment, the swappable personality customizable skin 102 is powered by the energy storage device 112, for example, a battery of the interactive core 101 exemplarily illustrated in FIG. 2C and FIG. 4C. In an embodiment, the skin pieces 102a and 102b of the swappable personality customizable skin 102 are powered by the energy storage device 112 of the interactive core 101 via the matching footprint pluggable and unpluggable pin contacts 106 between the interactive core 101 of the contact type exemplarily illustrated in FIG. 1 and FIGS. 2A-2C, and the skin pieces 102a and 102b. In this embodiment, the energy storage device 112 of the interactive core 101 transfers electrical energy to the skin pieces 102a and 102b of the swappable personality customizable skin 102 via the pin contacts 106. In another embodiment, the energy storage device 112 of the interactive core 101 transfers electrical energy to the skin pieces 102a and 102b of the swappable personality customizable skin 102 via wireless interfaces.

In an embodiment, one or more interface elements are positioned on the swappable personality customizable skin 102 of the interactive multimedia assistant device (IMAD) 100. For example, an input button 113 is positioned on a rear section 102c of the swappable personality customizable skin 102 as exemplarily illustrated in FIG. 5B, for activating a supplementary component 103, for example, a light emitting diode (LED) positioned on the swappable personality customizable skin 102. When a user presses the input button 113, the input button 113 sends a signal to the interactive core 101 to operate the supplementary component 103 positioned on the top skin piece 102a of the swappable personality customizable skin 102 as exemplarily illustrated in FIGS. 5A-5B. For example, when the user presses the input button 113, the input button 113 sends a signal to the interactive core 101 to provide electric power to a motor (not shown) disposed in the supplementary component 103 positioned on the top skin piece 102a of the swappable personality customizable skin 102 to move the supplementary component 103.

In an embodiment, to obviate the need for supplying additional electric power for operation of the swappable personality customizable skin 102, instead of a direct attachment to the swappable personality customizable skin 102, functional elements, supplementary components 103, and other interface elements, for example, the input button 113, for the swappable personality customizable skin 102 that are visible to and operable by a user, are positioned on the interactive core 101. In an embodiment, the input button 113 of the swappable personality customizable skin 102 is configured to contact the manual control input button 109 positioned on the rear section 101d of the interactive core 101 exemplarily illustrated in FIG. 2B and FIG. 4B, when the swappable personality customizable skin 102 is mounted onto the interactive core 101. When a user presses the input button 113 of the swappable personality customizable skin 102, the input button 113 contacts the manual control input button 109 of the interactive core 101 and activates the interactive core 101. The manual control input button 109 and the input button 113 are aligned and closely coupled to each other to form one action button as exemplarily illustrated in FIG. 5B. The swappable personality customizable skin 102 is configured to allow the multimedia sensors, for example, the image and/or gesture sensor 104 and the microphone 105 exemplarily illustrated in FIG. 5A, the output devices, for example, the output speakers 107, the light source 108, etc., the mechanical contact port 110, exemplarily illustrated in FIG. 2B, FIG. 4B, and FIG. 5B, and other input and the output components built within the interactive core 101, to access the outside environment when the interactive core 101 is completely encapsulated inside the swappable personality customizable skin 102, thereby allowing the multimedia sensors, the output devices, for example, 107, 108, etc., the mechanical contact port 110, and other input and the output components to function without performance degradation.

In an embodiment, the swappable personality customizable skin 102 has a built-in contactless and battery-less identification capability. The unique identifier of the swappable personality customizable skin 102 is communicated to the interactive core 101 on activating the interactive core 101. In an embodiment, the unique identifier of the swappable personality customizable skin 102 is transmitted to the interactive core 101 via the pin contacts 106 as disclosed in the detailed description of FIG. 1. In another embodiment, the unique identifier embedded in the swappable personality customizable skin 102 is read by the radio frequency identification (RFID) reader 128 of the interactive core 101 exemplarily illustrated in FIG. 7 and as disclosed in the detailed description of FIG. 3. In an embodiment, when the bottom skin piece 102b of the swappable personality customizable skin 102 is firmly coupled to the bottom end 101b of the interactive core 101, the bottom skin piece 102b transmits the unique identifier of the swappable personality customizable skin 102 to the interactive core 101 wirelessly on starting up operations of the interactive core 101.

In an embodiment, the interactive core 101 is activated upon receiving the unique identifier of the swappable personality customizable skin 102. In an embodiment, by transmitting the unique identifier of the swappable personality customizable skin 102 to the interactive core 101, the swappable personality customizable skin 102 directs and programs the behavior of the interactive core 101 to operate according to traits and style defined by the unique identifier, thereby allowing the interactive core 101 to assume the personality of the swappable personality customizable skin 102 for performing interactive communication with a user and for performing control actions based on multimedia inputs. The control actions comprise, for example, playing an audio input based on the unique identifier of the swappable personality customizable skin 102, playing music or other media content, performing a preset function, controlling external devices such as light bulbs, televisions, air conditioners, etc., and activating and deactivating one or more output devices, for example, 107, 108, etc., based on the multimedia inputs. In an example, a Darth Vader® personality skin of Lucas film Ltd. LLC, California, allows the interactive core 101 to assume the personality of Darth Vader® and perform an interactive communication with a user and perform control actions like Darth Vader®, while a Mickey Mouse® personality skin of Disney Enterprises, Inc., California, allows the interactive core 101 to assume the personality of Mickey Mouse® and perform an interactive communication with a user and perform control actions like Mickey Mouse®. In an embodiment, the interactive core 101, upon receiving the unique identifier of the swappable personality customizable skin 102, activates the swappable personality customizable skin 102 and directs and programs the behavior of the swappable personality customizable skin 102 based on the unique identifier. For example, the interactive core 101, upon receiving the unique identifier of the swappable personality customizable skin 102, activates the swappable personality customizable skin 102 and directs and programs the behavior of the swappable personality customizable skin 102 based on the unique identifier to move a supplementary component 103 positioned on the swappable personality customizable skin 102.

Figure 7:
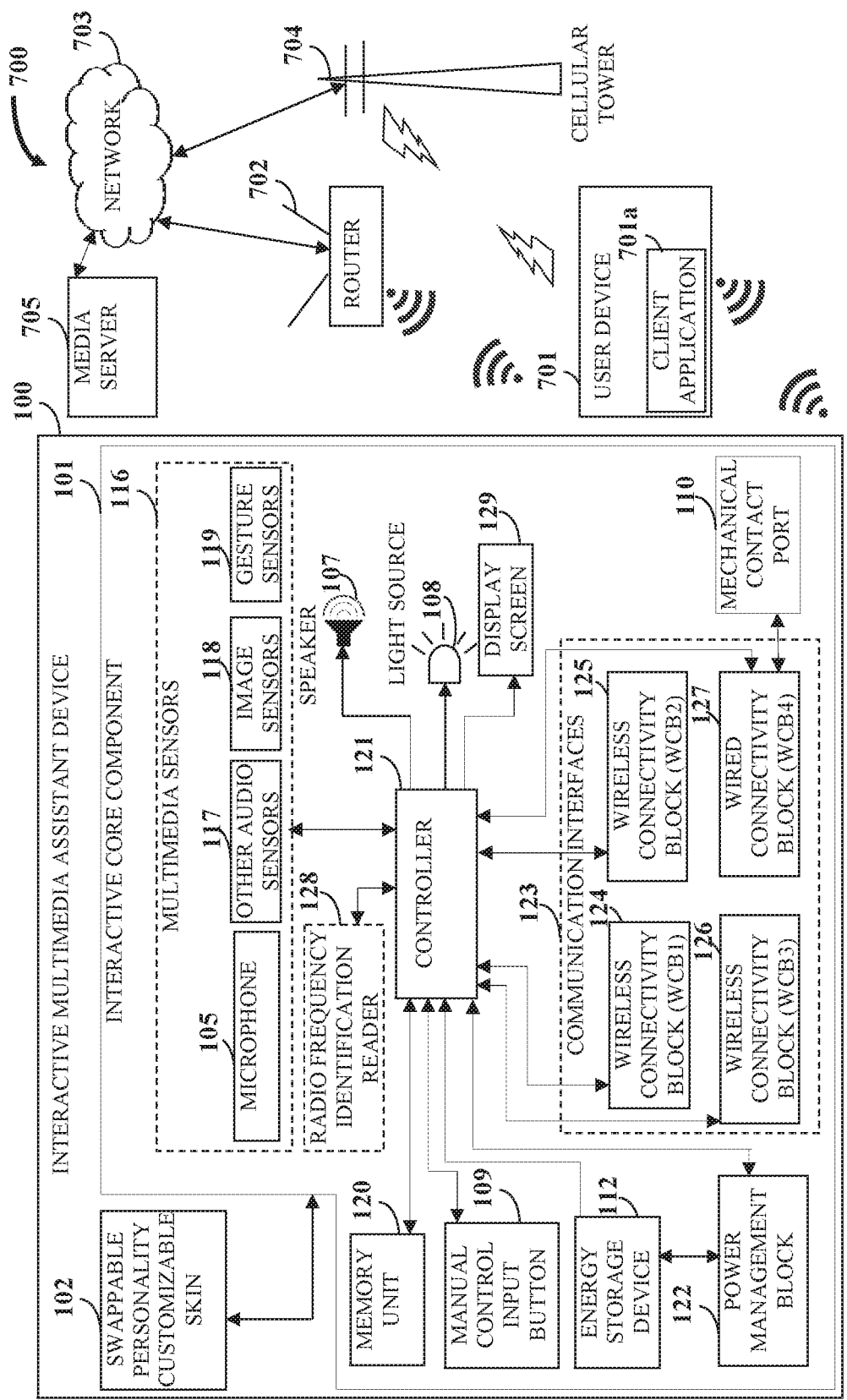
FIG. 7 exemplarily illustrates an implementation of a system comprising the interactive multimedia assistant device for performing interactive communication and control actions based on multiple multimedia inputs.

The swappable personality customizable skin 102 obtains electric power supplied by the energy storage device 112 of the interactive core 101 exemplarily illustrated in FIG. 2C and FIG. 4C, or in an embodiment, by the radio frequency identification (RFID) reader 128 of the interactive core 101 exemplarily illustrated in FIG. 7, for performing operations comprising, for example, wirelessly transmitting the unique identifier to the interactive core 101, and performing input, output, and display functions pertaining to the assigned unique identifier of the swappable personality customizable skin 102 such as moving the supplementary component 103, or activating a light emitting diode (LED) positioned on the swappable personality customizable skin 102, or receiving an input action on an interface element, for example, an input button 113 positioned on the swappable personality customizable skin 102, which in turn activates the manual control input button 109 positioned on the interactive core 101 as exemplarily illustrated in FIG. 2B and FIG. 4B, to operate a specific feature of the swappable personality customizable skin 102, etc.

Figure 6A:
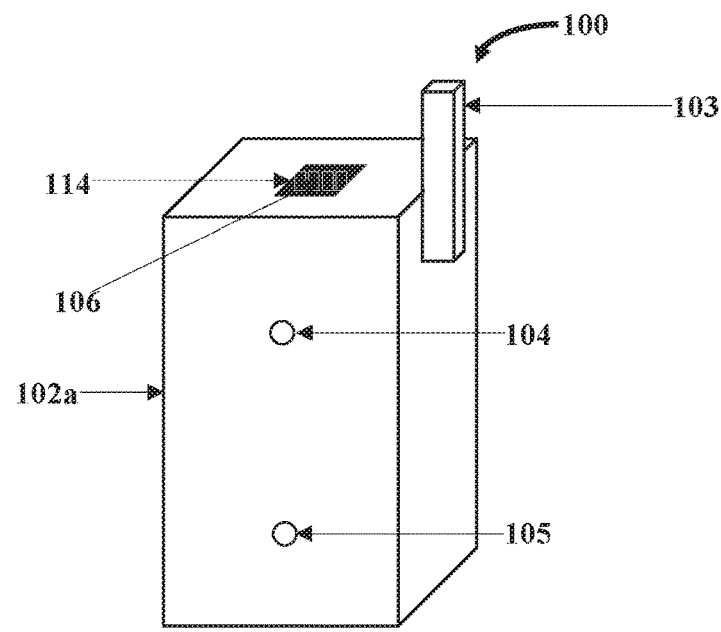
FIG. 6A exemplarily illustrates an interior view of the assembled interactive multimedia assistant device shown in FIG. 1.

FIG. 6A exemplarily illustrates an interior view of the assembled interactive multimedia assistant device (IMAD) 100 comprising the interactive core 101 of a contact type and the swappable personality customizable skin 102 shown in FIG. 1. The interior view of the assembled IMAD 100 in FIG. 6A, exemplarily illustrates an embedded chip 114 positioned, for example, in the top skin piece 102a of the swappable personality customizable skin 102. The unique identifier of the swappable personality customizable skin 102 is programmed in the embedded chip 114 during the manufacturing process. The embedded chip 114 is, for example, a smart card, a chip card, an integrated circuit card (ICC), etc., with the unique identifier of the swappable personality customizable skin 102 programmed therewithin. In an embodiment, the embedded chip 114 is an electrically erasable programmable read-only memory (EEPROM) chip, an erasable programmable read-only memory (EPROM) chip, etc., operably coupled to the interactive core 101 for allowing communication between the swappable personality customizable skin 102 and the interactive core 101 of the IMAD 100. In another embodiment, the embedded chip 114 comprises a mechanical pattern containing the unique identifier of the swappable personality customizable skin 102.

When the top skin piece 102a of the swappable personality customizable skin 102 is mounted onto the interactive core 101, the embedded chip 114 transmits the unique identifier of the swappable personality customizable skin 102 to the interactive core 101 via the pin contacts 106 as disclosed in the detailed description of FIG. 1 and FIGS. 5A-5B. When the swappable personality customizable skin 102 is mounted onto the interactive core 101, a circuit on the embedded chip 114 is closed, thereby allowing communication of data between the swappable personality customizable skin 102 and the interactive core 101 to allow the interactive core 101 to perform interactive communication and control actions based on multiple multimedia inputs. A mechanical contact between the swappable personality customizable skin 102 and the interactive core 101 via the embedded chip 114 allows the interactive core 101 to identify the swappable personality customizable skin 102. In an embodiment, an inter-integrated circuit ($I^2C$) bus between the swappable personality customizable skin 102 and the interactive core 101 via the embedded chip 114 of an electrically erasable programmable read-only memory (EEPROM) type or an erasable programmable read-only memory (EPROM) type allows the interactive core 101 to identify the swappable personality customizable skin 102.

Figure 6B:
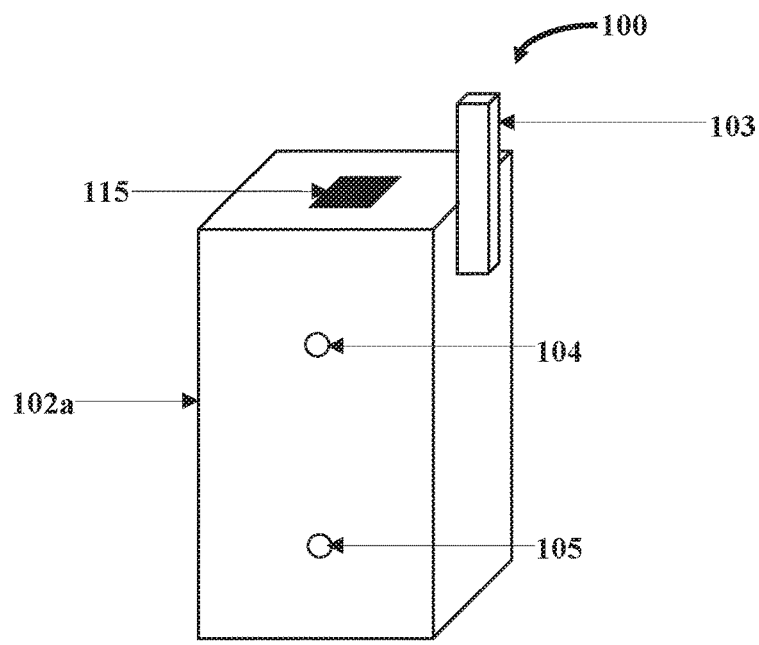
FIG. 6B exemplarily illustrates an interior view of the assembled interactive multimedia assistant device shown in FIG. 3.

FIG. 6B exemplarily illustrates an interior view of the assembled interactive multimedia assistant device (IMAD) 100 comprising the interactive core 101 of a contactless type and the swappable personality customizable skin 102 shown in FIG. 3. The interior view of the assembled IMAD 100 in FIG. 6B, exemplarily illustrates an embedded chip 115 positioned, for example, in the top skin piece 102a of the swappable personality customizable skin 102. The unique identifier of the swappable personality customizable skin 102 is programmed in the embedded chip 115 during the manufacturing process. The embedded chip 115 is a wireless chip with the unique identifier of the swappable personality customizable skin 102 programmed therewithin. In an embodiment, the embedded chip 115 is a radio frequency identification (RFID) chip comprising the RFID tag assigned to the swappable personality customizable skin 102. When the top skin piece 102a of the swappable personality customizable skin 102 is operably coupled on the interactive core 101, the RFID chip communicates with the RFID reader 128 of the interactive core 101 to allow communication of the RFID tag that uniquely identifies the swappable personality customizable skin 102 to the interactive core 101. FIG. 6B exemplarily illustrates a contactless type of the top skin piece 102a of the swappable personality customizable skin 102. When the top skin piece 102a of the swappable personality customizable skin 102 is mounted onto the interactive core 101, the unique identifier of the swappable personality customizable skin 102 is transmitted to the interactive core 101 via the embedded chip 115 positioned on the top skin piece 102a of the swappable personality customizable skin 102. In an embodiment, the bottom skin piece 102b is excluded from the swappable personality customizable skin 102 as exemplarily illustrated in FIG. 6A, when a mechanical interlocking mechanism, for example, the pin contacts 106 are provided between the swappable personality customizable skin 102 and the interactive core 101 of the IMAD 100.

FIG. 7 illustrates an implementation of a system 700 comprising the interactive multimedia assistant device (IMAD) 100 for performing interactive communication and control actions based on multiple multimedia inputs. The system 700 disclosed herein comprises the interactive core 101 and the swappable personality customizable skin 102 that constitute the IMAD 100 for performing interactive communication and control actions based on multiple multimedia inputs as disclosed in the detailed description of FIGS. 1-6B. The IMAD 100 operates in multiple modes, for example, in a standalone mode and/or by communicating with a user device 701. The IMAD 100 communicates with a user device 701 directly via wired interfaces and/or wireless interfaces, or in an embodiment, via a network 703 as exemplarily illustrated in FIG. 7. In an embodiment, the user device 701 is connected to a local area network. The user device 701 is an electronic device, for example, one or more of a personal computer, a tablet computing device, a mobile computer, a mobile phone, a smartphone, a portable computing device, a personal digital assistant, a laptop, a wearable computing device such as the Google Glass® of Google Inc., the Apple Watch® of Apple Inc., the Android Smartwatch® of Google Inc., etc., a touch centric device, a client device, a portable electronic device, a network enabled computing device, an interactive network enabled communication device, a gaming device, a television, an image capture device, any other suitable computing equipment, combinations of multiple pieces of computing equipment, etc. In an embodiment, the user device 701 is a hybrid computing device that combines the functionality of multiple devices. Examples of a hybrid computing device comprise a cellular telephone that includes a media player functionality, a gaming device that includes a wireless communications capability, a cellular telephone that includes game and multimedia functions, and a portable device that receives electronic mail (email), supports mobile telephone calls, has a media player functionality, and supports web browsing. In an embodiment, the computing equipment is used to implement applications such as media playback applications, a web browser, an email application, a calendar application, etc. The IMAD 100 disclosed herein is accessible to users, for example, through a broad spectrum of technologies and devices such as personal computers with access to the internet, internet enabled cellular phones, tablet computing devices, etc.

The user device 701 accesses the network 703 via a router 702 or a cellular tower 704. The network 703 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long term evolution (LTE) mobile communication network, a public telephone network, etc., a local area network, a wide area network, an internet connection network, an infrared communication network, etc., or a network formed from any combination of these networks.

The interactive core 101 of the interactive multimedia assistant device (IMAD) 100 comprises one or more of multiple multimedia sensors 116, a non-transitory computer readable storage medium such as a memory unit 120, a controller 121, one or more output devices, for example, 107, 108, and 129, and one or more communication interfaces 123. The multimedia sensors 116 are positioned within the interactive core 101 for detecting, recognizing, capturing, and tracking one or more multimedia inputs. The multimedia inputs comprise, for example, gestures, an image input, an audio input, geolocation inputs, etc., and any combination thereof. The multimedia sensors 116 comprise, for example, a microphone 105 and other audio sensors 117 such as Bluetooth® enabled voice recognizers, image sensors 118, and gesture sensors 119. The microphone 105 and other audio sensors 117 detect audio input, for example, sound, voice, etc. The image sensors 118 detect, recognize, capture, and track image input comprising, for example, facial features of a user. In an embodiment, the image sensors 118 are digital image sensors with flat panel detectors. The gesture sensors 119 detect, recognize, capture, and track gestures of the user. The gesture sensors 119 interpret human gestures using mathematical algorithms. The gestures detected by the gesture sensors 119 originate from any bodily motion or state, for example, from the user's face or hands. In an embodiment, the gesture sensors 119 detect and interpret gestures performed in low light and/or no light conditions using, for example, an infrared light source.

In an embodiment, the image sensors 118 and the gesture sensors 119 together perform face detection and facial recognition, gesture detection and gesture recognition, and face auto tracking. The image sensors 118 transmit a detected image and/or a detected video to the controller 121. The controller 121 performs face detection by detecting facial features of the user from the incoming image and/or video data stream and extracts face data for performing facial recognition analysis. In an embodiment, the facial recognition analysis comprises identification of a user from the image and/or the video received from the image sensors 118, by comparing the received image and/or the received video with facial features stored in a face database. In an embodiment, the controller 121 analyzes parameters comprising, for example, the size of objects in the received image and/or the received video, their motion properties, foreground pixels count, aspect ratio, etc., among possible distinctive and pertinent facial features, to identify the user and determine a path or a trajectory of the user's motion within a monitored region. Furthermore, the controller 121 extracts the user's facial expression from the incoming image and/or video data stream to represent the user's emotion or state of mind that allows the interactive multimedia assistant device (IMAD) 100 to act or respond accordingly. After identification of the user, the controller 121 executes a predetermined function, for example, providing a greeting to the user, playing a media file, etc. The interactive core 101 automatically tracks the detected face or the identified user within the proximity of the image sensors 118. In an embodiment, the interactive core 101 is operably coupled to a swappable personality customizable skin 102 comprising an in-built motor (not shown) that allows the interactive core 101 to move. The interactive core 101 issues a command to power and move the IMAD 100 to follow a monitored or moving user automatically. In an embodiment, the image sensors 118 are three-dimensional (3D) image sensors. In an embodiment, the IMAD 100 utilizes pan-tilt-zoom (PTZ) sensors for automatically tracking movements of the user. The multimedia inputs received by the multimedia sensors 116 are transformed, processed, and executed by one or more algorithms in the controller 121 for performing interactive communication and control actions.

The non-transitory computer readable storage medium such as the memory unit 120 of the interactive core 101 stores the multimedia inputs and media content. The media content comprises, for example, music, videos, news, blogs, data received from the user device 701, etc. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the controller 121. The memory unit 120 of the interactive core 101 also stores program instructions, applications, and data. The memory unit 120 is, for example, a random access memory (RAM) or another type of dynamic storage device that stores information and instructions for execution by the controller 121. The memory unit 120 stores temporary variables and other intermediate information used during execution of the instructions by the controller 121. In an embodiment, the interactive core 101 further comprises a read only memory (ROM) or another type of static storage device that stores static information and instructions for the controller 121.

The controller 121 of the interactive core 101 is configured to execute computer program instructions for processing the multimedia inputs received from the multimedia sensors 116, modulating an audio output, and performing one or more control actions based on the processed multimedia inputs. In an example where the controller 121 receives audio input, for example, voice and sound from the microphone 105 and other audio sensors 117, the controller 121 performs voice and sound modulation of the received audio input. The controller 121 modulates the received audio input to modulate a voice output associated with a personality identified by the unique identifier of the swappable personality customizable skin 102. For example, if the Darth Vader® personality skin is operably coupled to the interactive core 101, on receiving the unique identifier from the Darth Vader® personality skin, the controller 121 modulates the voice output to sound like Darth Vader®. The output devices, for example, 107, 108, and 129 are operably connected to the controller 121 for rendering outputs of the controller 121. The output devices comprise, for example, output speakers 107 for playing the stored media content and the detected audio input. In the above example, on modulating the voice, the output speakers 107 can repeat a sentence spoken by the user in the voice of Darth Vader®. The controller 121 modulates the stored sentences of the user and renders the modulated voice and sounds to the output speakers 107. The controller 121 also plays stored sound or music via the output speakers 107. The controller 121 also performs sound and speech recognition and repeats a detected sentence from the user's speech via the output speakers 107.

In an embodiment, the output devices further comprise, for example, one or more light sources 108 such as light emitting diodes (LEDs) for indicating one of the received multimedia inputs, for example, the manual control input, and status of the control actions. In an embodiment, the light sources 108 indicate response to or reception of a sensed image, a gesture, an audio command, a voice command, etc. In another embodiment, the light sources 108 provide a visual confirmation of an action request received through a gesture, a voice command, etc. In another embodiment, the light sources 108 positioned on the interactive core 101 are used as a night light, a bed side light, etc. In an embodiment, the controller 121 controls the light sources 108 based on the audio input received from the microphone 105 and the audio sensors 117. In an embodiment, the output devices further comprise, for example, a display screen 129 for displaying stored or streamed media content. The display screen 129 comprises, for example, a video display, a liquid crystal display, a plasma display, an organic light emitting diode (OLED) based display, etc. In an embodiment, the display screen 129 displays a response to the multimedia inputs.

The interactive core 101 further comprises one or more interface elements, for example, the manual control input button 109 positioned on the interactive core 101 for receiving a manual control input to control one or more output devices, for example, 107, 108, and 129. The manual control input button 109 renders an interface to allow the user to provide the manual control input. The manual control input button 109 is operably connected to the controller 121 as exemplarily illustrated in FIG. 7. In an embodiment, the manual control input button 109 is used for activating one or more supplementary components 103 positioned on the swappable personality customizable skin 102, for example, a light emitting diode (LED) light positioned on the top skin piece 102a of the swappable personality customizable skin 102 exemplarily illustrated in FIG. 1, FIG. 3, and FIGS. 6A-6B. The controller 121 controls and processes the input received from the image sensors 118, the gesture sensors 119, and the interface element, for example, the manual control input button 109. In an embodiment, the controller 121 activates the output devices, for example, 107, 108, and 129 in accordance with the personality of the swappable personality customizable skin 102 identified by the unique identifier.

The interactive core 101 is not limited to employing a controller 121. In an embodiment, the interactive core 101 employs a processor. The processor refers to any one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor is implemented as a processor set comprising, for example, a programmed microprocessor and a math or graphics co-processor. The processor is selected, for example, from the Intel® processors such as the Itanium® microprocessor, the Pentium® processors, the Intel® Core i5 processor, the Intel® Core i7 processor, etc., Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The communication interfaces 123 of the interactive core 101 communicate with the swappable personality customizable skin 102 positioned on the interactive core 101. The communication interfaces 123 comprise, for example, wired interfaces, or wireless interfaces, or any combination thereof. In an embodiment, the communication interfaces 123 are provided as interface blocks. The communication interfaces 123 comprise, for example, an infrared interface, an inter-integrated circuit (I²C) interface, a Wi-Fi® interface, a Bluetooth® interface, a radio-frequency identification (RFID) interface, a wired universal serial bus (USB) interface, a wireless USB interface, interfaces based on transmission control protocol (TCP)/internet protocol (IP), interfaces based on wireless communications technology such as radio frequency technology, near field communication (NFC), etc. In an embodiment, the communication interface for the interactive core 101 of the contact type is, for example, the I²C interface, a universal asynchronous receiver-transmitter (UART) interface, or a universal serial bus (USB) interface. In an embodiment, the communication interface for the interactive core 101 of the contactless type comprises, for example, a Wi-Fi® interface, an RFID interface, an interface based on NFC, a Bluetooth® interface, an infrared interface, a wireless USB interface, a long term evolution (LTE) interface, an independent side band (ISB) radio frequency interface, a general packet radio service (GPRS) interface, etc.

In an embodiment, the interactive core 101 implements near field, mid-range, and wide area wireless connectivity. As exemplarily illustrated in FIG. 7, the communication interfaces 123 of the interactive core 101 comprise four built-in blocks, for example, a wireless connectivity block 1 (WCB1) 124, a wireless connectivity block 2 (WCB2) 125, a wireless connectivity block 3 (WCB3) 126, and a wired connectivity block 4 (WCB4) 127. The interactive core 101 implements a built-in near field connectivity function, for example, radio frequency identification (RFID), near field communication (NFC), Bluetooth® low energy (BLE), etc., using the WCB1 124. The interactive core 101 implements a built-in mid-range wireless connectivity function, for example, a Wi-Fi® connectivity function using the WCB2 125. The interactive core 101 further implements a wide area cellular data connectivity function, for example, general packet radio service (GPRS), long term evolution (LTE), etc., using the WCB3 126. The interactive core 101 implements a wired connectivity function using the WCB4 127.

The unique identifier programmed during the manufacturing process of the swappable personality customizable skin 102 is communicated to the interactive core 101 through one of the communication interfaces 123, for example, through a wireless and contactless connectivity interface such as the radio frequency identification (RFID) interface of the wireless connectivity block 1 (WCB1) 124, during the startup initialization of the interactive core 101. In an embodiment, the interactive core 101 comprises an RFID reader 128 for reading the unique identifier or the RFID tag embedded in the swappable personality customizable skin 102. In another embodiment, the RFID reader 128 emits radio signals used for powering the swappable personality customizable skin 102. The WCB1 124 reads the unique identifier of the swappable personality customizable skin 102 using the RFID reader 128 and communicates the read unique identifier to the controller 121 for processing. The controller 121 activates the functions and the features associated with the swappable personality customizable skin 102, and directs and programs behavior of the swappable personality customizable skin 102 based on the unique identifier, thereby allowing the interactive multimedia assistant device (IMAD) 100 to assume the personality of the swappable personality customizable skin 102 for performing interactive communication with the user and control actions comprising, for example, playing the audio input based on the unique identifier of the swappable personality customizable skin 102, playing the stored media content, performing a preset function, controlling external devices, and activating and deactivating one or more output devices, for example, 107, 108, and 129 based on the multimedia inputs. One or more of the communication interfaces 123, for example, the wireless connectivity block 2 (WCB2) 125 and the wireless connectivity block 3 (WCB3) 126 enable connection of the interactive core 101 to the user device 701. In an embodiment, the IMAD 100 is connected to the network 703, for example, the internet through a Wi-Fi® connection and paired with the user device 701, for example, through a Bluetooth® wireless connection. The wired connectivity block 4 (WCB4) 127 connects the interactive core 101 to the user device 701 via the mechanical contact port 110.

The interactive core 101 further comprises the energy storage device 112 as exemplarily illustrated in FIG. 2C and FIG. 4C, that receives electrical energy from a power source (not shown) and stores the received electrical energy for activating the multimedia sensors 116, the controller 121, the output devices, for example, 107, 108, and 129, and the communication interfaces 123 of the interactive core 101, and for powering the swappable personality customizable skin 102. The energy storage device 112 is, for example, a battery, a rechargeable battery, a charging dock, a cradle charger, etc. The energy storage device 112 transmits the electrical energy to the interactive core 101 and the swappable personality customizable skin 102 and activates the interactive core 101 and the swappable personality customizable skin 102 respectively. The energy storage device 112 provides portability to the interactive multimedia assistant device (IMAD) 100.

In an embodiment, the energy storage device 112 is operably connected to a power management block 122 of the interactive core 101. The power management block 122 is operably connected to the controller 121. The power management block 122 maintains a long battery life operation of the interactive core 101. The power management block 122 protects the energy storage device 112 from overcharge or over discharge conditions. The power management block 122 also controls the flow and direction of electrical energy from the energy storage device 112 to the multimedia sensors 116, the controller 121, the output devices, for example, 107, 108, and 129, and the communication interfaces 123 of the interactive core 101. In an embodiment, the power required to transmit the unique identifier of the swappable personality customizable skin 102 to the interactive core 101 is supplied in a contactless manner by the energy available from the radio frequency identification (RFID) interrogating radio signals sourced from the interactive core 101. In another embodiment, for additional power to sustain further input, output, and display functions, matching footprint pin contacts (not shown) between the swappable personality customizable skin 102 and the bottom end 101b of the interactive core 101 are used to provide the required power flow from the interactive core 101 to the swappable personality customizable skin 102. The swappable personality customizable skin 102 locks onto the interactive core 101, allows the multimedia sensors 116, the output devices, for example, 107, 108, and 129, the manual control input button 109, etc., to function properly, and allows easy replacement and/or recharging of the energy storage device 112. In an embodiment, the interactive multimedia assistant device (IMAD) 100 is targeted to a battery powered portable application, which utilizes low power protocols.

Consider an example where the interactive multimedia assistant device (IMAD) 100 disclosed herein is used for performing interactive communication with a user and control actions based on multimedia inputs. The image sensors 118 and the gesture sensors 119 of the interactive core 101 dynamically identify a user's face and gestures in an image input and store the identified user's face and gestures in the memory unit 120. The microphone 105 and the audio sensors 117 of the interactive core 101 detect a sound and the user's voice. The microphone 105 converts the sound and the voice into an electrical signal. In an embodiment, the microphone 105 is manually disabled by pressing an interface element, for example, a mute button (not shown) positioned on the interactive core 101 to deactivate the audio input. The controller 121 of the interactive core 101 receives the electrical signal from the microphone 105 and the user's face and gestures from the memory unit 120 and performs control actions comprising, for example, playing the audio input received from the microphone 105 via the output speakers 107, based on the unique identifier that defines the personality of the swappable personality customizable skin 102 coupled to the interactive core 101, playing the media content, performing a preset function, and activating and deactivating the light sources 108 based on the multimedia inputs. The controller 121 identifies and recognizes the user's face via the image sensors 118 and the gesture sensors 119 and plays a sound bite via the output speakers 107. The controller 121 accesses and plays prestored music from the memory unit 120 via the output speakers 107, and performs a preset function, for example, plays the stored media content, reads a news article, etc., via the output speakers 107. The controller 121 captures and analyzes sentences spoken by a user and repeats the sentences in a modulated voice pertaining to the personality of the swappable personality customizable skin 102.

In an embodiment, the interactive core 101 operably coupled to the swappable personality customizable skin 102 is in operable communication with a client application 701*a* deployed on the user device 701 via one or more of the communication interfaces 123, for example, the wireless connectivity block 2 (WCB2) 125 and the wireless connectivity block 3 (WCB3) 126 over the network 703. The client application 701*a* renders location-based data of the user device 701 to the interactive core 101 of the interactive multimedia assistant device (IMAD) 100. In an embodiment, the client application 701*a* programs functions on the interactive core 101 based on the multimedia inputs and updates the interactive core 101, after receiving and rendering the location-based data of the user device 701. The client application 701*a* on the user device 701 streams media content received from a media server 705 to the IMAD 100. The media server 705 is connected to the network 703, which is accessible by the user device 701 via the router 702 or the cellular tower 704. The streamed media content is stored in the memory unit 120 of the interactive core 101 of the IMAD 100 for future play. The router 702 communicates with the network 703 and fetches updates for the user device 701 and the interactive core 101. The user device 701 communicates with the router 702 to receive the updates and transmits the updates to the interactive core 101 of the IMAD 100. In an embodiment, the cellular tower 704 communicates with the network 703 to send the updates to the user device 701 and the interactive core 101 of the IMAD 100.

In an embodiment, a user interacts with the interactive multimedia assistant device (IMAD) 100 disclosed herein through the client application 701*a* on the user device 701. The interactive core 101 of the IMAD 100 communicates with the client application 701*a* on the user device 701, for example, via the built-in Wi-Fi® or near field connectivity function such as radio frequency identification (RFID), near field communication (NFC), Bluetooth® low energy (BLE), etc., using the wireless connectivity block 1 (WCB1) 124. In another embodiment, the interactive core 101 communicates with the client application 701*a* on the user device 701 using the wired connectivity block 4 (WCB4) 127, for example, a universal asynchronous receiver-transmitter (UART) interface, a universal serial bus (USB) interface, etc., via the mechanical contact port 110. The user can update sound or program the interactive core 101 with selected functions to associate, for example, with a gesture, sentence, word, face detection, or people detection, using the client application 701*a* on the user device 701. The interactive core 101 is updated each time the interactive core 101 connects to the user device 701. The user can update the client application 701*a* with new functions, features, and data via the network 703. In an embodiment, the client application 701*a* can be updated in a cloud computing environment. As used herein, "cloud computing environment" refers to a processing environment comprising configurable computing physical and logical resources, for example, networks, servers, storage media, virtual machines, applications, services, etc., and data distributed over the network 703. The cloud computing environment provides on-demand network access to a shared pool of the configurable computing physical and logical resources. Through the communication interfaces 123, for example, the wireless connectivity block 2 (WCB2) 125 and the wireless connectivity block 3 (WCB3) 126 of the interactive core 101, the interactive core 101 plays streaming news, music, etc., setup by the client application 701*a* on the user device 701. In the system 700 disclosed herein, the IMAD 100 comprising the interactive core 101 operably coupled with the swappable personality customizable skin 102 interfaces with the client application 701*a* on the user device 701, for performing interactive communication and control actions based on multimedia inputs, and therefore more than one specifically programmed system is used for implementing the system 700 disclosed herein.

The system 700 disclosed herein improves the functionality of human-to-machine interaction systems and provides an improvement in voice controlled assistant related technology as follows. The interactive multimedia assistant device (IMAD) 100 disclosed herein performs interactive actions using multimedia inputs, for example, an image input, an audio input, a gesture input, geolocation inputs, etc., and any combination thereof. The swappable personality customizable skin 102 of the IMAD 100 is assigned and programmed with a unique identifier that identifies traits and style of a particular personality defined by the swappable personality customizable skin 102. The interactive core 101 of the IMAD 100 communicates with the swappable personality customizable skin 102 to assume the personality defined by the swappable personality customizable skin 102 and behave in accordance with the identified traits and style of the swappable personality customizable skin 102, thereby facilitating customization of the interactive core 101 for performing interactive actions and preset functions. The interactive core 101 dynamically adapts to the location of the user device 701. The interactive core 101 downloads and plays a personality driven sound bite, music, personality related features, etc., based on the location of the user device 701. The interactive core 101 is updated with new features available based on the location-based data obtained by the client application 701*a* deployed on the user device 701 via the network 703. The system 700 disclosed herein allows customization of the interactive core 101 in terms of adding distinct appearances and behavior of a preferred personality or a preferred character defined by the swappable personality customizable skin 102 to the interactive core 101. Moreover, the interactive core 101 assumes a swappable personality defined by the user, interactively communicates with the user through the swappable personality, and performs multiple control actions based on multiple different multimedia inputs provided by the user. Furthermore, the interactive core 101 dynamically updates functions and receives location-based data from the user device 701 to retrieve and play the media content created for the traits and style of the swappable personality defined by the swappable personality customizable skin 102.

In the system 700 disclosed herein, the design and the flow of interactions between the swappable personality customizable skin 102, the interactive core 101, and the client application 701a on the user device 701 are deliberate, designed, and directed. Every multimedia input provided to the interactive core 101 is configured by the interactive core 101 to steer the interactive core 101 towards a finite set of predictable outcomes. The interactions designed by the system 700 disclosed herein allow the interactive core 101 to collect multimedia inputs from the user, and from these multimedia inputs, through the use of other, separate and autonomous computer programs, perform interactive communication and control actions based on the multimedia inputs. To process the multimedia inputs, communicate with the swappable personality customizable skin 102, modulate an audio output, perform interactive communication and control actions based on the multimedia inputs, and render the output of the controller 121 of the interactive core 101 requires separate computer programs and subprograms, the execution of which cannot be performed by a person using a generic computer with a generic program.

The focus of the system 700 disclosed herein is on an improvement to the device functionality itself, and not on economic or other tasks for which a generic computer is used in its ordinary capacity. Accordingly, the system 700 disclosed herein is not directed to an abstract idea. Rather, the system 700 disclosed herein is directed to a specific improvement to the way the interactive core 101 of the interactive multimedia assistant device (IMAD) 100 in the system 700 operates, embodied in, for example, activating the swappable personality customizable skin 102, assuming the personality defined by the swappable personality customizable skin 102 to direct and program the behavior of the swappable personality customizable skin 102 to operate according to traits and style of the personality defined by the swappable personality customizable skin 102, performing interactive actions using the multimedia inputs, communicating with the client application 701a on the user device 701 for streaming location-based news, music, etc., receiving updates, etc.

Figure 8:
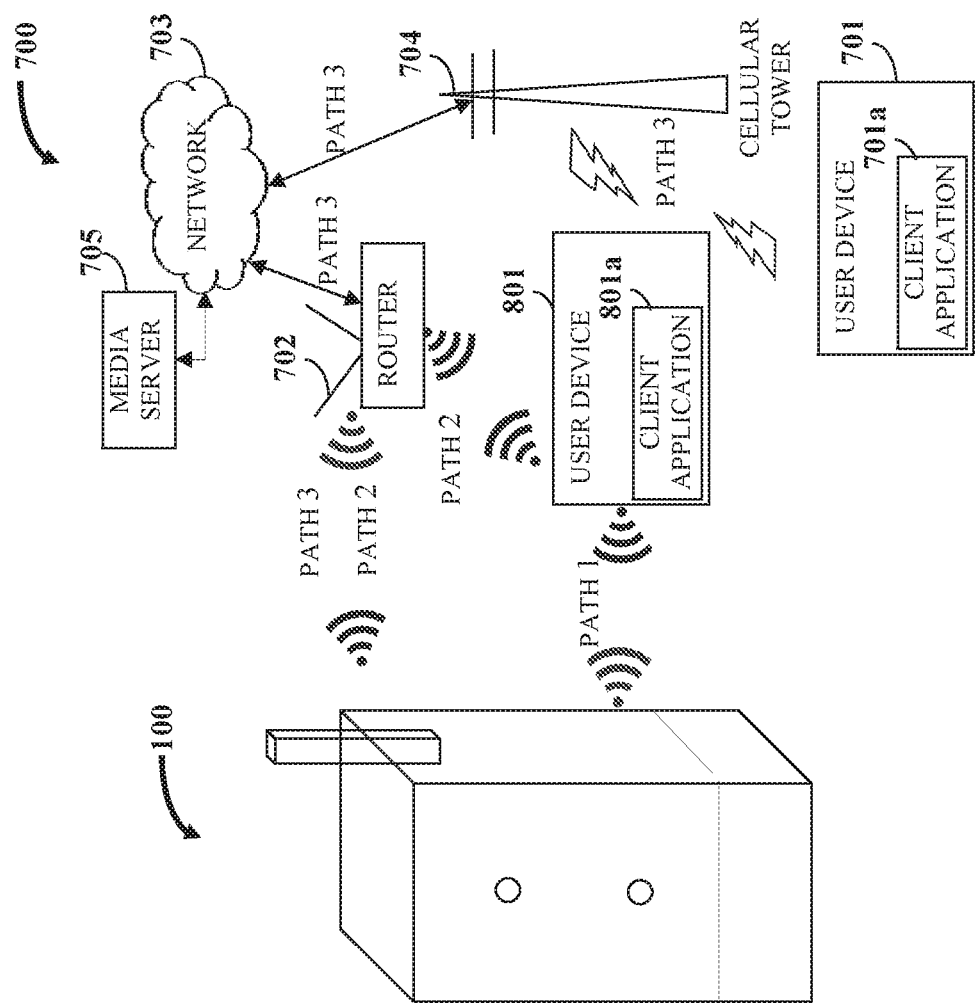
FIG. 8 exemplarily illustrates another implementation of the system comprising the interactive multimedia assistant device for performing interactive communication and control actions based on multiple multimedia inputs.

FIG. 8 exemplarily illustrates another implementation of the system 700 comprising the interactive multimedia assistant device (IMAD) 100 for performing interactive communication and control actions based on multiple multimedia inputs. In an embodiment, the IMAD 100 communicates with multiple user devices, for example, 701 and 801 via the network 703 as exemplarily illustrated in FIG. 8. The IMAD 100 communicates with the user devices 701 and 801 through multiple paths. For example, the IMAD 100 communicates with the user device 801 directly using path 1 as exemplarily illustrated in FIG. 8, using wireless communication protocols, for example, the Wi-Fi® communication protocol, the Bluetooth® communication protocol, etc. The user device 801 communicates with the IMAD 100 using the client application 801a deployed on the user device 801. In another example, the IMAD 100 communicates with the user device 801 using path 2 as exemplarily illustrated in FIG. 8, via the router 702. The router 702 communicates with the network 703 and fetches updates for the user device 801 and the IMAD 100. In another example, the user device 701 communicates with the IMAD 100 using path 3 as exemplarily illustrated in FIG. 8, via the cellular tower 704, the network 703, and the router 702. In this example, the user device 701 establishes a connection to the cellular tower 704 using a cellular network, a mobile network, etc.; the cellular tower 704 communicates with the network 703; and the network 703 communicates with the router 702, which communicates with the IMAD 100, thereby establishing the connection between the user device 701 and the IMAD 100. In an embodiment, the user devices 701 and 801 communicate with the IMAD 100 using a wired connection to the wired connectivity block 4 (WCB4) 127 of the interactive core 101 of the IMAD 100 exemplarily illustrated in FIG. 7. In an embodiment, the client applications 701a and 801a deployed on the user devices 701 and 801 respectively, communicate with each other using multiple modes of wired and wireless communication for interacting with the IMAD 100.

FIGS. 9A-9D exemplarily illustrate applications of the interactive multimedia assistant device (IMAD) 100 in performing interactive communication and control actions based on multiple multimedia inputs. In an embodiment as exemplarily illustrated in FIG. 9A, the IMAD 100 communicates with a dedicated device 901, for example, a remote control device that remotely controls the interactive core 101 of the IMAD 100 exemplarily illustrated in FIG. 1, FIG. 3, and FIG. 7, to follow commands that are programmed in the dedicated device 901. The dedicated device 901 utilizes wireless signals of, for example, Bluetooth®, Wi-Fi®, independent sideband (ISB) radio frequency signals, infrared signals, etc., to interact with the IMAD 100. The dedicated device 901 comprises built-in function buttons 901a that are programmed for activating one or more specific functions of the interactive core 101. When a user activates one or more of the function buttons 901a of the dedicated device 901, the IMAD 100 performs the functions corresponding to the activated function buttons on the dedicated device 901. For example, when the user activates one of the function buttons 901a of the dedicated device 901, the IMAD 100 plays media content stored in the memory unit 120 of the interactive core 101 exemplarily illustrated in FIG. 7. In another example, the IMAD 100 performs a control action such as turning off lights, turning off home security systems, etc., in a home environment, when a user activates one or more function buttons 901a of the dedicated device 901. In an embodiment, the dedicated device 901 communicates with the IMAD 100 directly using path 1 as exemplarily illustrated in FIG. 9A, using wireless communication protocols, for example, the Wi-Fi® communication protocol, the Bluetooth® communication protocol, etc. In another embodiment, the dedicated device 901 communicates with the IMAD 100 using path 2 as exemplarily illustrated in FIG. 9A, via the router 702. The router 702 communicates with the network 703 and fetches updates for the IMAD 100. In an example, when the user activates one of the function buttons 901a of the dedicated device 901 to obtain weather data, the router 702 acquires the weather data from the network 703 and transmits the weather data to the IMAD 100. The IMAD 100 then conveys the weather data in a voice defined by the swappable personality customizable skin 102 of the IMAD 100 exemplarily illustrated in FIG. 1, FIG. 3, and FIGS. 5A-5B, to the user.

Figure 9A:
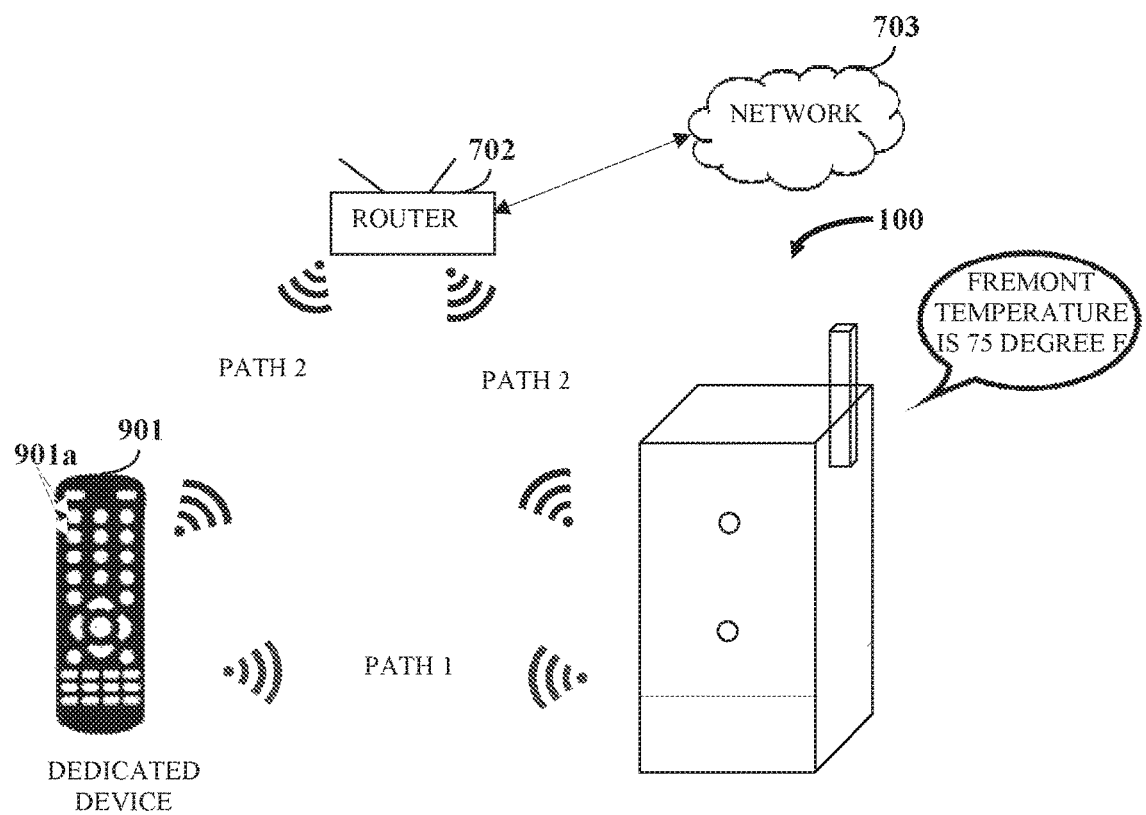
FIGS. 9A-9D exemplarily illustrate applications of the interactive multimedia assistant device in performing interactive communication and control actions based on multiple multimedia inputs.
Figure 9B:
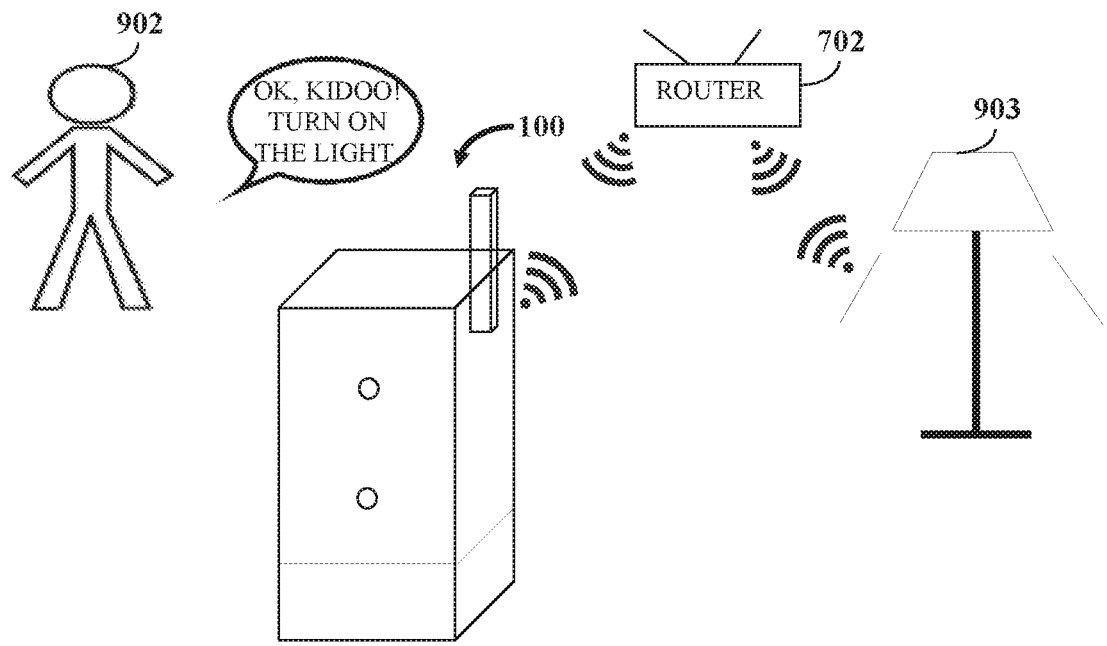
Figure 9C:
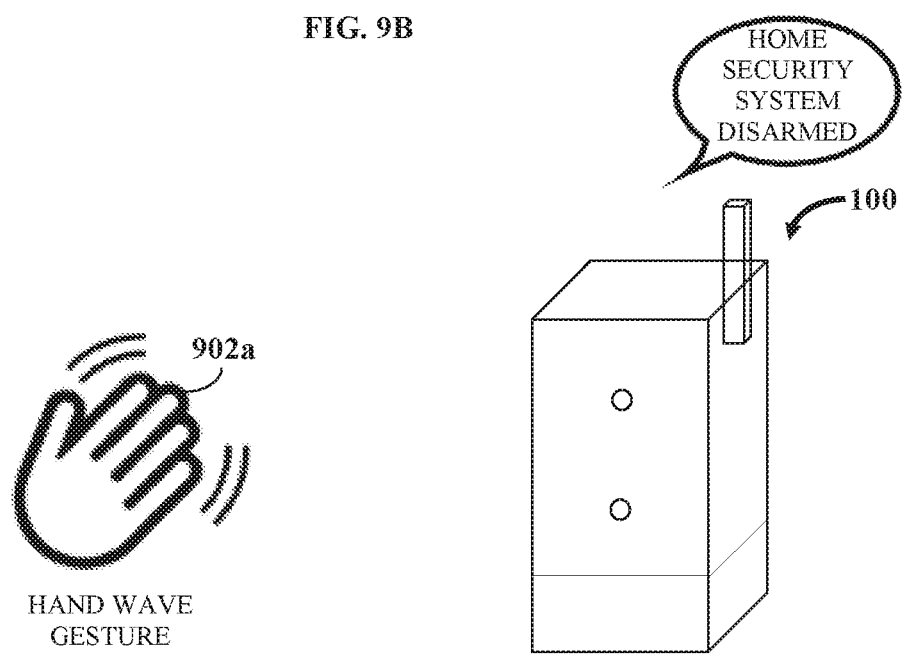

In an embodiment, the interactive core 101 coupled with the swappable personality customizable skin 102 operates in a home environment in a standalone mode without assistance from the user device 701 as exemplarily illustrated in FIGS. 9B-9C. In an embodiment, the interactive core 101 comprises a Bluetooth® enabled voice recognizer as one of the audio sensors 117 exemplarily illustrated in FIG. 7, and output speakers 107 exemplarily illustrated in FIG. 2B, FIG. 4B, FIG. 5B, and FIG. 7. The Bluetooth® enabled voice recognizer of the interactive core 101 is programmed to follow instructions spoken by a user 902 from across a room or from another room. The microphone 105 and the other audio sensors 117 of the interactive core 101 exemplarily illustrated in FIG. 7, recognize voice of different wavelengths. When the microphone 105 and the audio sensors 117 recognize the user's 902 voice through speech recognition, the interactive core 101 speaks out according to the personality of the swappable personality customizable skin 102 at an immersive resonance through the output speakers 107 or performs a control action such as turning on lights in the home environment based on a voice instruction spoken by the user 902. In an embodiment, the interactive multimedia assistant device (IMAD) 100 communicates with the lights of a lamp 903 in the home environment via the router 702 as exemplarily illustrated in FIG. 9B.

When the image sensors 118 and the gesture sensors 119 of the interactive core 101 recognize a face of a particular user 902 in the home environment through gesture recognition, the interactive core 101 plays the stored media content, for example, a sound bite, music, etc., performs preset functions such as modulating the voice or repeating the recognized sentences spoken by the user 902 in accordance with the personality of the swappable personality customizable skin 102, reading out a news article, controlling other devices such as lights, a television, etc., in the home environment. In an embodiment, the interactive core 101 automatically repeats the sentences detected in the modulated voice through the personality defined by the unique identifier of the swappable personality customizable skin 102.

The interactive multimedia assistant device (IMAD) 100 recognizes and captures gestures made by the user 902 through the gesture sensors 119 of the interactive core 101 and performs control actions. In an embodiment, the gesture sensors 119 comprise one or more muscle sensors and a multi-axis motion sensor for tracking movement of the user 902. For example, when the user 902 enters a home environment, the image sensors 118 of the interactive core 101 of the IMAD 100 capture and recognize an image of the user 902. In this example, when the user 902 waves a hand 902a at the IMAD 100 as exemplarily illustrated in FIG. 9C, the gesture sensors 119 detect the hand wave gesture and transmit the hand wave gesture to the controller 121 of the interactive core 101 coupled with the swappable personality customizable skin 102. The controller 121 determines that the hand wave gesture corresponds to a control action, for example, disarming a home security system without manual intervention. The IMAD 100 conveys the action of disarming the home security system to the user 902 in a voice defined by the swappable personality customizable skin 102 of the IMAD 100. In another example, when the user 902 lifts an arm, the interactive core 101 coupled with the swappable personality customizable skin 102 imitates the voice of the personality of the coupled swappable personality customizable skin 102 and communicates with the user 902. The interactive core 101 performs control actions, for example, turns on or turns off lights, on receiving an audio input from the microphone 105, image and gesture inputs from the image sensors 118 and the gesture sensors 119 respectively, and manual inputs received from the user 902 by a press action on an interface element, for example, the manual control input button 109 positioned on the interactive core 101 exemplarily illustrated in FIG. 2B, FIG. 4B, and FIG. 7.

Figure 9D:
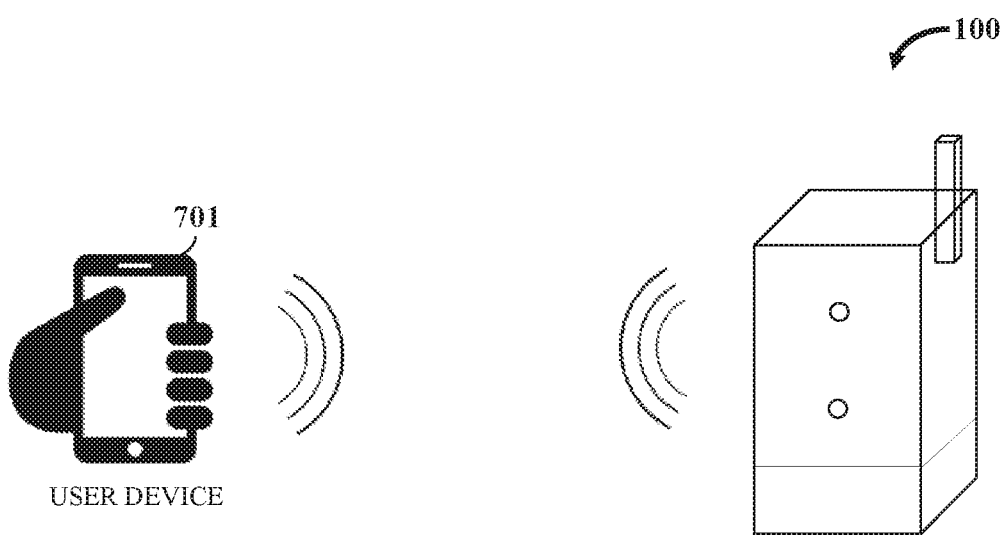

In another example, the interactive multimedia assistant device (IMAD) 100 interacts with a user device 701 as exemplarily illustrated in FIG. 9D. The user 902 interacts with the interactive core 101 coupled with the swappable personality customizable skin 102 through the client application 701a deployed on the user device 701 exemplarily illustrated in FIG. 7. The interactive core 101 of the IMAD 100 uses one of the communication interfaces 123, for example, the wireless connectivity block 1 (WCB1) 124 exemplarily illustrated in FIG. 7, to communicate with the user device 701. The IMAD 100 allows the user 902 to update sound and program the interactive core 101 with selected functions to associate with a designated gesture, sentence or word, face detection or people detection, etc., via the client application 701a deployed on the user device 701. The client application 701a deployed on the user device 701 receives updates, for example, new functions, new data, new features, etc., via the network 703 exemplarily illustrated in FIGS. 7-8, and dynamically updates the interactive core 101 of the IMAD 100, when the IMAD 100 connects to the user device 701 over the network 703. The client application 701a deployed on the user device 701 utilizes the communication interfaces 123, for example, the wireless connectivity block 2 (WCB2) 125 and the wireless connectivity block 3 (WCB3) 126 of the interactive core 101 exemplarily illustrated in FIG. 7, to interact with the IMAD 100, stream news or music setup by the client application 701a to the IMAD 100, transmit updates such as a sound bite segment pertaining to the personality of the swappable personality customizable skin 102, to the swappable personality customizable skin 102 of the IMAD 100, etc. The IMAD 100 performs personality aware streaming of music, news, etc., as set up by the client application 701a deployed on the user device 701.

Figure 10A:
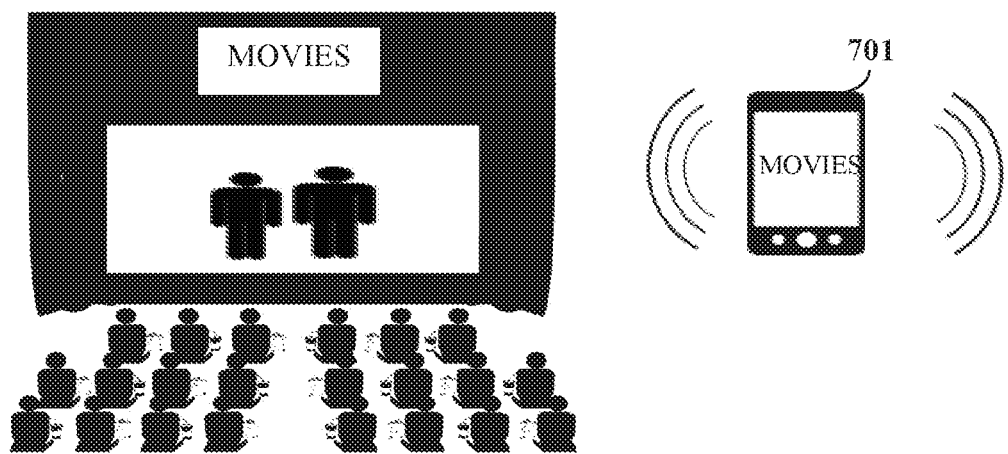
FIGS. 10A-10B exemplarily illustrate another application of the interactive multimedia assistant device in performing interactive communication and control actions based on geolocation inputs.
Figure 10B:
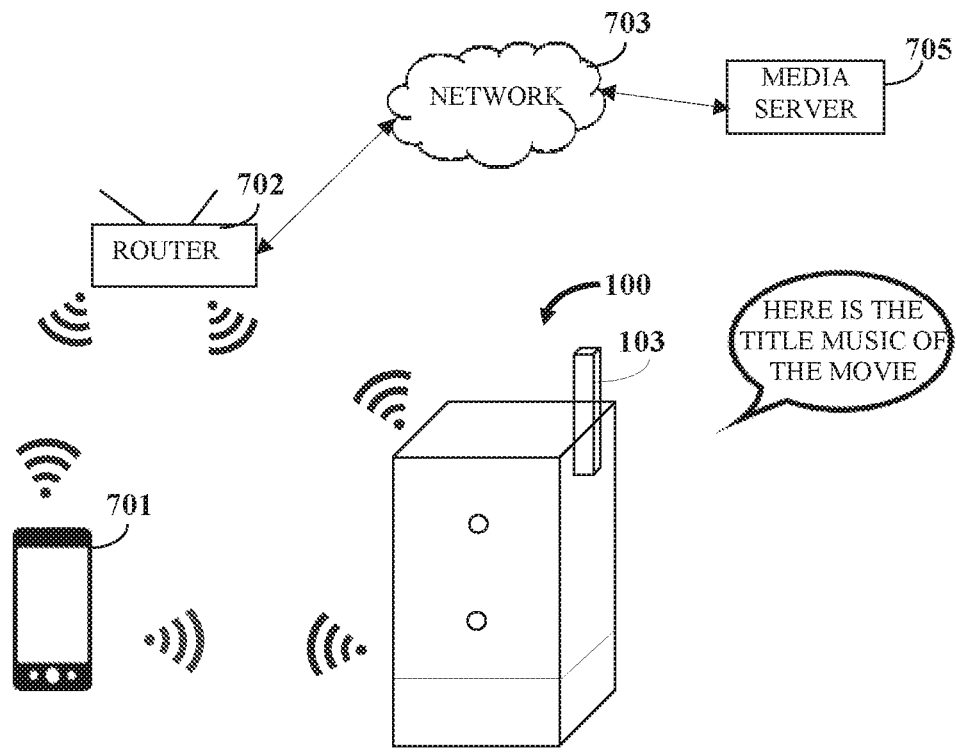

FIGS. 10A-10B exemplarily illustrate another application of the interactive multimedia assistant device (IMAD) 100 in performing interactive communication and control actions based on geolocation inputs. The IMAD 100 utilizes geolocation data of a user device 701 to implement location aware applications. A user downloads the client application 701a exemplarily illustrated in FIG. 7, on the user device 701. The client application 701a allows the user device 701 to obtain a location specific token when the user visits or stays at a designated location for a period of time, or to enter a code from a ticket obtained by attending an event, for example, a movie event at a movie theater. When the client application 701a sends location information, for example, global positioning system (GPS) data that the user device 701 detected to a local server or a cloud server residing in a cloud computing environment, the local server or the cloud server sends the location specific token to the user device 701. When the user reaches a home location where the IMAD 100 is positioned, on receiving the location specific token from the user device 701, for example, directly or through the router 702 that connects to the network 703, the IMAD 100 sends the received location specific token to the media server 705 via the network 703 and receives a prearranged download, for example, a song, a text message, a voice message, a video file or an image file, or in an embodiment, a control function that facilitates movement of the supplementary component 103 of the IMAD 100 from the media server 705. The IMAD 100 thereafter receives, for example, new features, functions, songs, and voice sound bites from the media server 705 over the network 703.

In an example, when a user watches a movie at a movie theater, the user may receive a location specific token to download a new sound or music associated with the movie onto the user device 701 as exemplarily illustrated in FIG. 10A. The user can then download the received location specific token to the IMAD 100 using the client application 701a on the user device 701 to allow the IMAD 100 to download a new sound bite, music, functions and features, etc., into the interactive core 101, thereby allowing the interactive core 101 to play a new sound, music, etc., display show times of upcoming movies on the display screen 129 exemplarily illustrated in FIG. 7, or perform other functions as exemplarily illustrated in FIG. 10B. The downloaded location specific token allows the IMAD 100 to download the media files, functions, and features via the network 703 as exemplarily illustrated in FIG. 10B. In another embodiment, the IMAD 100 is directly positioned at an event location, for example, a movie theater, where the IMAD 100 directly receives the location specific token and/or the corresponding downloads, for example, by interacting with a WiFi® hotspot as provided by the movie theater. This direct reception of the location specific token and/or the corresponding downloads obviates the need for the user device 701 to serve as an intermediary for an eventual reception of the location specific token and/or the downloads. In another application, the user may carry both the IMAD 100 and the user device 701 to a specific location for updating the IMAD 100 to implement location aware applications. The IMAD 100 can therefore be configured to operate as a real time remote monitoring device.

It is apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions for programming the interactive core 101 exemplarily illustrated in FIG. 1, FIG. 3 and FIG. 7, can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the system 700 exemplarily illustrated in FIG. 7, disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the system 700 disclosed herein are implemented as programmed elements, or non-programmed elements, or any suitable combination thereof.

The system 700 disclosed herein can be configured to work in a network environment comprising one or more computers that are in communication with one or more devices via the network 703 exemplarily illustrated in FIG. 7. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 703. Each of the computers and the devices executes an operating system selected, for example, from the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google LLC, the Windows Phone® operating system of Microsoft Corporation, the BlackBerry® operating system of BlackBerry Limited, the iOS operating system of Apple Inc., the Symbian™ operating system of Symbian Foundation Limited, etc. While the operating system may differ depending on the type of computer, the operating system provides the appropriate communications protocols to establish communication links with the network 703. Any number and type of machines may be in communication with the computers.

The system 700 disclosed herein is not limited to a particular computer system platform, processor, operating system, or network. In an embodiment, one or more aspects of the system 700 disclosed herein are distributed among one or more computer systems, for example, servers configured to provide one or more services to one or more client computers, or to perform a complete task in a distributed system. For example, one or more aspects of the system 700 disclosed herein are performed on a client-server system that comprises components distributed among one or more server systems that perform multiple functions according to various embodiments. These components comprise, for example, executable, intermediate, or interpreted code, which communicate over the network 703 using a communication protocol. The system 700 disclosed herein is not limited to be executable on any particular system or group of systems, and are not limited to any particular distributed architecture, network, or communication protocol.

The foregoing examples have been provided merely for explanation and are in no way to be construed as limiting of the interactive multimedia assistant device (IMAD) 100 and the system 700 disclosed herein. While the IMAD 100 and the system 700 have been described with reference to various embodiments, it is understood that the words, which have been used herein, are words of description and illustration, rather than words of limitation. Furthermore, although the IMAD 100 and the system 700 have been described herein with reference to particular means, materials, and embodiments, the IMAD 100 and the system 700 are not intended to be limited to the particulars disclosed herein; rather, the IMAD 100 and the system 700 extend to all functionally equivalent structures, methods and uses, such as are within the scope of the appended claims. While multiple embodiments are disclosed, it will be understood by those skilled in the art, having the benefit of the teachings of this specification, that the IMAD 100 and the system 700 disclosed herein are capable of modifications and other embodiments may be effected and changes may be made thereto, without departing from the scope and spirit of the IMAD 100 and the system 700 disclosed herein.

What is claimed is:

1. A personality device to customize operation of an interactive multimedia assistant device, the personality device comprising:
    a skin configured to couple with a core component of the interactive multimedia assistant device, the skin having an appearance corresponding to a personality of the personality device, the skin including an interface portion permitting one or more sensors of the core component to access an ambient environment through the skin for receiving one or more of a plurality of multimedia inputs, the plurality of multimedia inputs comprising gestures, an image input, and an audio input;
    one or more skin pieces of the skin having one or more interior surfaces configured to be adjacent an exterior surface of a housing of the core component with the skin coupled to the core component;
    one or more communication interfaces for communicating with the core component;
    a non-transitory computer readable storage medium for storing at least one of media content and the plurality of multimedia inputs; and
    an identification device of the skin, the identification device including an identifier that identifies the personality of the personality device, wherein the identifier is configured to cause the core component to assume the personality of the personality device for performance of at least one control action by the core component upon the one or more sensors of the core component receiving the one or more of the plurality of multimedia inputs,
    wherein the core component is configured for communication with a client application deployed on a user device, via one or more interfaces over a network, to cause performance by the core component of at least one of:
        receive location-based data of said user device,
        program a function of the core component,
        update the core component, and
        stream said media content.

2. The personality device of claim 1, wherein the skin comprises a first skin piece and a second skin piece, and wherein the first skin piece is configured to couple to a first portion of the core component and the second skin piece is configured to couple to a second portion of the core component.

3. The personality device of claim 2, wherein the core component is at least partially covered by the skin when the first skin piece and the second skin piece are coupled to the first portion and second portion of the core component.

4. The personality device of claim 2, wherein the interface portion of the skin comprises one or more apertures.

5. The personality device of claim 4, wherein the skin includes one or more apertures aligned with one or more output devices of the core component.

6. The personality device of claim 5, wherein the one or more output devices comprises one or more of an output speaker, a light source, and a display screen.

7. The personality device of claim 1, further comprising a supplementary component, wherein the supplementary component comprises a movable element, and wherein the personality device further includes a motor operatively coupled to the movable element, a controller of the core component configured to cause the motor to move the movable element upon the core component receiving the one or more of the plurality of multimedia inputs.

8. The personality device of claim 1, further comprising a supplementary component, wherein the supplementary component comprises a light-emitting diode, and wherein a controller of the core component is configured to cause operation of the light-emitting diode upon the core component receiving the one or more of the plurality of multimedia inputs.

9. The personality device of claim 1, further comprising a supplementary component, wherein the skin further includes an input button, and wherein actuation of the input button is configured to cause operation of the supplementary component.

10. The personality device of claim 1, wherein the identification device comprises one or more of a memory storage device embedded in the skin, and a mechanical pattern.

11. The personality device of claim 1, wherein the identification device comprises one or more of a smart card, a chip card, an integrated circuit card, an erasable programmable read-only memory chip, and a radio frequency identification tag.

12. The personality device of claim 1, wherein the one or more communication interfaces for communicating with the core component are configured for communicating via at least one of a wired connection and a wireless connection.

13. The personality device of claim 12, wherein the one or more communication interfaces are further configured to receive power from a power source of the core component via at least one of the wired connection and the wireless connection.

14. The personality device of claim 1, wherein the appearance and the personality of the personality device correspond with at least one of a movie character, a cartoon character, a game character, an animal, a car, and an airplane.

15. The personality device of claim 1, wherein reception of the identifier by a controller of the core component causes activation of at least one of a function or a feature of the interactive multimedia assistant.

16. The personality device of claim 15, wherein the at least one function or feature is received via a network or a user device.

17. The personality device of claim 1, wherein the at least one control action comprises modulating an audio input, playing media content, activating a function of the core component, activating a feature of the core component, controlling external devices, activating one or more output devices of the core component, and deactivating one or more output devices of the core component.

* * * * *